(12) United States Patent  
Yajima

(10) Patent No.: US 7,654,627 B2  
(45) Date of Patent: Feb. 2, 2010

(54) INKJET RECORDING APPARATUS AND METHOD FOR PROCESSING RECORDING DATA

(75) Inventor: Masato Yajima, Mitaka (JP)

(73) Assignee: Canon Finetech Inc., Ibaraki (JP)

( * ) Notice: Subject to any disclaimer, the term of this patent is extended or adjusted under 35 U.S.C. 154(b) by 345 days.

(21) Appl. No.: 11/457,789

(22) Filed: Jul. 14, 2006

(65) Prior Publication Data

US 2007/0019014 A1    Jan. 25, 2007

(30) Foreign Application Priority Data

Jul. 19, 2005    (JP)    ............................. 2005-208925

(51) Int. Cl.
*B41J 29/38*    (2006.01)

(52) U.S. Cl. ....................................................... 347/13

(58) Field of Classification Search .................... 347/13
See application file for complete search history.

(56) References Cited

U.S. PATENT DOCUMENTS 5,160,945 A * 11/1992 Drake ........................... 347/42

6,264,299 B1 * 7/2001 Noda ........................... 347/15

FOREIGN PATENT DOCUMENTS

| JP | 06-143689 | 5/1995 |
| JP | 10-138525 | 5/1998 |

* cited by examiner

*Primary Examiner*—Julian D Huffman  
(74) *Attorney, Agent, or Firm*—pattenttm.us

(57) ABSTRACT

An inkjet recording apparatus that records data on a recording medium based on recording data and using a plurality of line heads includes a thinning pattern generation unit (12) that generates one line of thinning pattern for determining whether or not each bit of the recording data is to be recorded; a shift processing unit (13) that shifts the thinning pattern a predetermined number of bits; and a thinning processing unit (14) that, for each line head, generates thinned-out recording data generated by thinning out the recording data by applying the thinning pattern, shifted by the predetermined number of bits, to the recording data, wherein each line head is driven by the thinned-out recording data generated by the thinning processing unit (14). The shift processing unit (13) shifts the thinning pattern, generated by the thinning pattern generation processing unit (12), the predetermined number of bits to prevent the same thinning pattern from being used for the adjacent lines in the feed direction.

9 Claims, 22 Drawing Sheets

| DUTY VALUE SETTING VALUE[%] | REGISTER SETTING VALUE | REGISTER SETTING VALUE | UNIT-THINNING PATTERN |
|---|---|---|---|
| 50 | 0101-0101-0101-0101-0101-0101 | h'5_5555 | |
| 55 | 0101-0101-0110-0101-1010-1011 | h'5_56AB | |
| 60 | 0101-1010-1101-0110-0110-1011 | h'5_AD6B | |
| 65 | 0110-1101-1011-0110-0110-1101 | h'6_DB6B | |
| 70 | 0110-1101-1101-1011-0111 | h'6_DDB7 | |
| 75 | 0111-0111-0111-0111-0111 | h'7_7777 | |
| 80 | 0111-1011-1101-1110-1111 | h'7_BDEF | |
| 85 | 0111-1110-1111-1101-1111 | h'7_EFDF | |
| 90 | 0111-1111-1101-1111-1111 | h'7_FDFF | |
| 95 | 0111-1111-1111-1111-1111 | h'7_FFFF | |
| 100 | 1111-1111-1111-1111-1111-1111 | h'F_FFFF | |

FIG. 7

FIG. 12A  BIT PART FOR WHICH THINNING PROCESSING IS PERFORMED
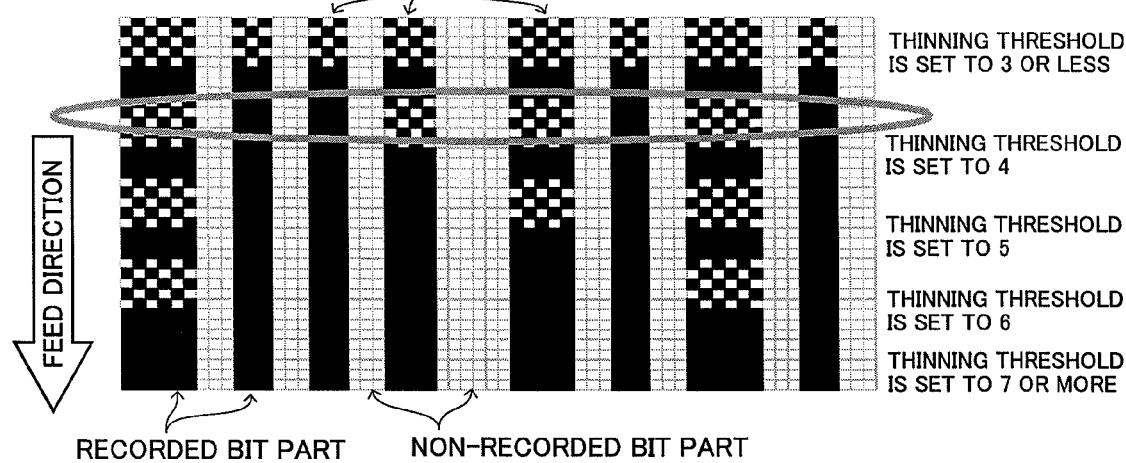
FIG. 12B THINNING THRESHOLD (DUTY_THIN) IS SET TO "1"
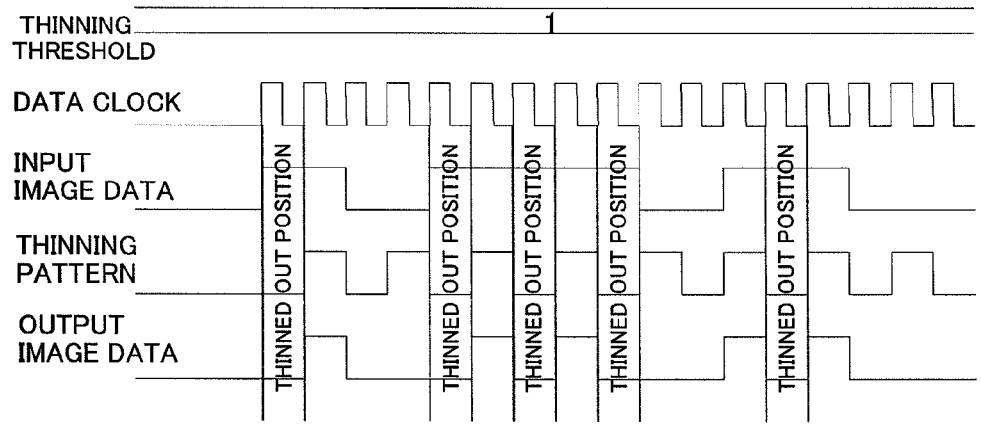
FIG. 12C THINNING THRESHOLD (DUTY_THIN) IS SET TO "3"
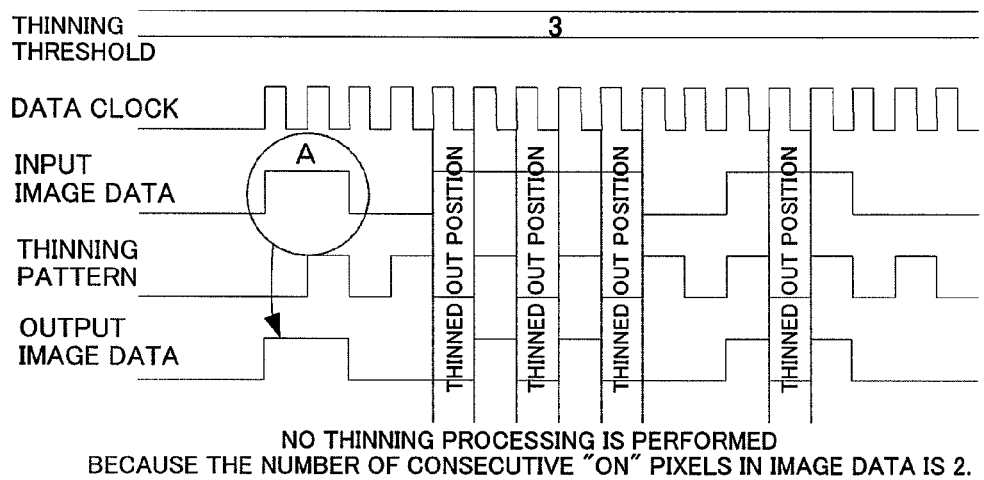
NO THINNING PROCESSING IS PERFORMED
BECAUSE THE NUMBER OF CONSECUTIVE "ON" PIXELS IN IMAGE DATA IS 2.

LINE SHIFT WHEN DUTY SETTING VALUE IS 60%

1-BIT SHIFT

2-BIT SHIFT

3-BIT SHIFT

INKJET RECORDING APPARATUS AND METHOD FOR PROCESSING RECORDING DATA

DETAILED DESCRIPTION

1. Field of the Invention

The present invention relates to an inkjet recording apparatus suitable for color and high-speed recording.

2. Related Art

An inkjet recording apparatus has become widely used as printing means for various applications because of its advantages in high-speed and quiet printing, easy colorization, and low running costs. Especially, an inkjet recording apparatus, which uses a line head extending across the full width of a recording medium such as a printing paper sheet, has found more and more applications as an industrial printer because of its high-speed operation. Industrial printing is applied, for example, to form printing or printing on card boards.

When performing a print with an inkjet recording apparatus at high density, that is, in high-duty printing operation, the ink fixing speed in a densely printed part immediately after the recording depends on, and the fixing time varies according to, the properties of the ink and the recording medium used. Especially, because the ink fixing speed is slower than the feed speed of a recording medium during high-speed printing, a transfer from the feed roller to the recording medium occurs and, sometimes, this causes unwanted ink to be adhered to an image part or ink to be printed on the next page, thus degrading the image quality.

Because this condition frequently occurs during high-speed printing by means of line heads, it is necessary to change the properties of ink or to use a special recording medium to prevent such a condition. Alternatively, a fixing unit is used, while the recording medium is fed, to heat a recording medium is heated with a heater to dry ink.

For example, for use in recording data in multiple colors on multiple sheets of paper successively and at a relatively high speed, an inkjet recording apparatus is known that forces ink, sprayed on a paper sheet, to dry directly or indirectly in order to prevent a reverse transfer onto an ejection roller or an ink stain on the paper immediately after recording (See Japanese Patent Laid-Open Publication No. Hei 10-138525).

A technology is also disclosed which monitors recording patterns and, when a solid printed pattern (that is, a full print area) is detected, performs thinned-out recording in a non-outline area in the pattern (Japanese Patent Laid-Open Publication No. Hei 6-143689).

However, because ink is forced to dry evenly regardless whether the recording is coarse or dense in the method disclosed in Japanese Patent Laid-Open Publication No. Hei 10-138525, there is a possibility of a color change or paper deformation and, in addition, the printer becomes too large to handle easily.

Although the method disclosed in Japanese Patent Laid-Open Publication No. Hei 6-143689 is preferable in terms of both printer's power consumption and ink drying performance, the recording is thinned out regardless of the size of a full print area and, therefore, there is a possibility that the recorded result differs largely from the original image and regularly-repeated images could appear in the thinned-out areas. In addition, thinned-out recording is applied only to a sold print area and, therefore, the ink may not be sometimes dried sufficiently in an area printed not solidly but at a relatively high density.

It is also possible to change the properties of ink or to use only a limited recording medium. However, because the user requires a variety of ink and recording medium, it is difficult to limit the type of ink and recording medium. The use of a fixing unit increases both the size and the cost of the apparatus.

On the other hand, one of the methods for increasing the ink fixing speed at high-speed recording time is to control the ink ejection amount (recording duty) for an image to be recorded and thereby reduce the amount of ink ejected on the paper surface for improving ink fixability. To control the recording duty, a possible method is to apply thinning pattern data to recording data.

When selecting a thinning pattern, dispersed thinning and randomized thinning must be considered. Dispersed thinning refers, for example, to thinned-out recording that is performed evenly in any positions in a line when data is recorded by means of a line head. This dispersed thinning, if fully achieved, ensures the recording duty values (density) that are even in a recorded image in its entirety.

Randomized thinning refers, for example, to thinned-out recording with no correlation between the lines in the feed direction of a recording medium when data is recorded by means of a line head. If this randomized thinning is not fully achieved, thinned-out recording is performed in the same position in the lines and, as a result, the thinned-out part is recorded as a blank line (or a white line). This randomized thinning, if fully achieved, prevents degradation in the image quality of a small-font character or a thin line formed by a small number of dots.

One of the methods for creating a thinning pattern for use in the thinning processing in an inkjet recording apparatus is to use general-purpose software. However, in a high-speed line printer where the data transfer speed is important, software processing requires the execution time of a thinning-out program and therefore could prevent high-speed recording.

It is possible to perform the thinning processing in the host (PC) instead of in an inkjet recording apparatus. In this case, comparison between the compressed data amount of a thinned-out image and the compressed data amount of a non-thinned-out image indicates that the data mount of the thinned-out image is larger because the image compression rate is reduced by the thinning processing when the thinned-out image is compressed. This means an increase in the amount of image data transferred from the host (PC) to the inkjet recording apparatus, which sometimes affects the data transfer speed and makes it difficult to perform high-speed recording that is a feature of a line head printer.

When the thinning pattern is a regularly-repeated pattern in the thinning processing, the thinning pattern sometimes becomes conspicuous in a regularly recorded image part or a thin straight line. For a thin line formed by a small number of bits such as a line formed by two or three dots in line width, the thinning processing, which is performed under duty control using a recording duty value close to the number of bits forming the thin line, could lose a part of the recording image, degrading its solidity.

A line head printer records one line using a long head extending in a lateral direction orthogonal to the feed direction of a recording medium. Therefore, though it is easy to disperse thinned-out dots in a thinning pattern in the lateral direction, it is difficult to disperse the thinned-out dots of a thinning pattern in the feed direction. This sometimes results in the same thinning pattern appearing consecutively between the adjacent lines in the feed direction. When the same thinning pattern is recorded consecutively, small-font characters could sometimes be lost.

One solution to this problem is to generate combined, randomized thinning data through the random data generation processing of one page of recording data and record the generated data. However, the generation of one page of randomized thinning data takes long and requires a large amount of memory to temporarily store the generated thinning data.

SUMMARY OF THE INVENTION

In view of the above problem, it is an object of the present invention to provide an apparatus and a method suitable for performing the thinning processing of recording data in a simple configuration without reducing the operation speed.

To achieve the above object, an inkjet recording apparatus that records data on a recording medium based on recording data comprises a plurality of line heads each of which has a plurality of recording elements across a whole recording medium area and drives the plurality of recording elements in each line for recording the recording data; a thinning pattern generation unit that generates one line of thinning pattern for determining whether or not each bit of the recording data is to be recorded; a shift processing unit that shifts the thinning pattern in a recording width direction; and a thinning processing unit that, for each line head, generates thinned-out recording data generated by thinning out the recording data by applying the thinning pattern, shifted by the shift processing unit, to the recording data, wherein each line head is driven by the thinned-out recording data generated by the thinning processing unit.

The inkjet recording apparatus of the present invention uses the shift processing unit to shift one line of thinning pattern, generated by the thinning pattern generation unit, the predetermined number of bits to prevent the same thinning pattern from being used for the adjacent lines in the feed direction and to make the thinning pattern dispersed in the feed direction. This shift processing, which is performed simply by shifting one line of thinning pattern the predetermined number of bits, is fast and requires only a small amount of memory.

The thinning pattern generation unit of the present invention can arrange multiple unit-thinning patterns in the recording width direction to generate one line of thinning pattern. This unit-thinning pattern comprises multiple consecutive bits, and each of the bits specifies whether or not each bit of the recording data is to be recorded.

The shift processing of the present invention includes initial shift processing that sets a shift among line heads and line shift processing that sets a shift among lines for one head.

The initial shift processing shifts the thinning pattern by an initial shift amount that differs among the line heads for each line head of the multiple line heads to set a shift among the line heads. When multiple line heads perform the thinning processing at the same time, this initial shift ensures the randomized thinning among the lines heads. The multiple line heads may be multiple line heads of different recording colors or multiple line heads of the same color.

The line shift processing shifts either the one thinning pattern or the thinning pattern shifted by the initial shift processing unit for each same line head of the multiple line heads in the right or left direction each time a line is recorded to set a shift among the lines. This line shift ensures the randomized thinning in the recording of the same line head. One of the initial shift processing and the line shift processing can be performed, or both shift processing can be performed.

In addition to the apparatus described above, the present invention includes a recording data processing method.

A recording data processing method of the present invention is an inkjet recording method for recording data on a recording medium based on recording data and using a plurality of line heads, wherein thinning threshold processing is performed to determine whether or not thinning processing is to be performed. If the recording data is highly concentrated, that is, the duty is high and there is a possibility of the fixing problem, the thinning processing is performed to limit the amount of recording on the recording medium. Conversely, if the duty of the recording data is not so high and there is no possibility of the fixing problem, the thinning processing is not performed and the recording data is recorded directly on the recording medium.

This thinning threshold processing comprises the steps of counting the number of consecutive ON pixels which is the number of ejected dots consecutively appearing on the line in the recording data in each one line, comparing the number of consecutive ON pixels with a preset thinning threshold, and, if the number of consecutive ON pixels is larger than the thinning threshold, applying the predetermined thinning pattern to the recording data for thinning the recording data.

An other recording data processing method is an inkjet recording method for recording data on a recording medium based on recording data and using a plurality of line heads, wherein shift processing is performed so that a thinning pattern to be applied to the recording data differs from line head to line head. In one implementation of the shift processing, one line of thinning pattern is shifted in the recording width direction a predetermined number of bits for each line head, and this thinning pattern is applied to the recording data to perform thinning processing.

In another mode of shift processing in which a thinning pattern to be applied to the recording data differs from line head to line head, first shift processing in which a predetermined one line of thinning pattern is shifted in a recording width direction a predetermined number of bits sequentially for each line head and second shift processing in which a block of the thinning pattern is shifted in the recording width direction a predetermined number of bits when the same line head records a next line are performed. The thinning pattern, obtained by the shift processing, is applied to the recording data.

The inkjet recording apparatus of the present invention, simple in configuration, thins out recording data more properly without affecting high-speed processing.

The thinning-out processing of the present invention is performed on the side of the inkjet recording apparatus using a small amount of data in the processing. Therefore, this configuration enables high-speed recording without affecting the data transfer speed.

The inkjet recording apparatus determines the positions where thinning is required and performs thinning processing for all recording data, thus preventing image quality degradation caused by reducing data in positions where thinning is not necessary.

The inkjet recording apparatus can increase the ink fixing time even at high-speed recording time, thereby enabling high-quality and high-speed processing.

BRIEF DESCRIPTION OF THE DRAWINGS

FIG. 7 is a diagram showing an example of thinning patterns of the present invention;

FIGS. 12A-12C are diagrams showing the thinning threshold processing of the present invention;

PREFERRED EMBODIMENTS OF THE INVENTION

Preferred embodiments of the present invention will be described below with reference to the drawings.

Figure 1:
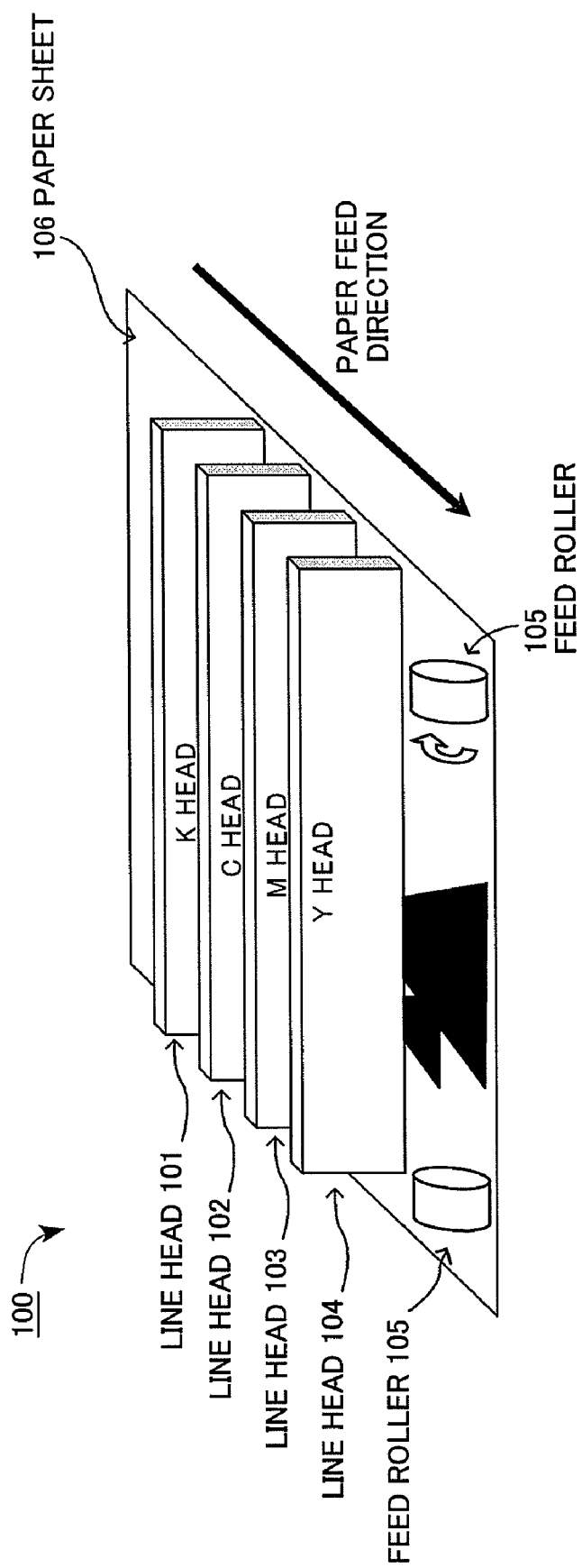
FIG. 1 is a diagram showing the general outline of a line-type recording head (line head) that can be applied to an inkjet recording apparatus of the present invention.

FIG. 1 is a general external view showing a line-type recording head (i.e., line head) part applicable to an inkjet recording apparatus according to the present invention.

A recording head 100 has multiple line heads 101-104. Each line head has multiple recording elements arranged across the recording width of a paper sheet 106, that is, in the direction orthogonal to the feed direction of the paper sheet 106 (recording medium). Ink is ejected from the nozzles, corresponding to the recording elements, by driving the recording elements, and one line extending across the recording width is recorded at a time.

When data is printed in color using the multiple line heads 101-104, the multiple heads, that is, the black head (K) 101, cyan head (C) 102, magenta head (M) 103, and yellow head (Y) 104, are sequentially arranged in the feed direction.

The multiple line heads 101-104 may be the same color heads, for example, the black heads (K), that are arranged in the feed direction. This configuration, in which the same-color heads are arranged in the feed direction, enables multiple lines of the same color to be recorded at the same time for high-speed recording.

The heads of the recording head 100 are set in the fixed positions and, when feed rollers 105 feed the paper sheet 106, the positional relation between the line heads 101-104 and the paper sheet 106 is changed. The line heads 101-104, which are K, C, M, and Y in color respectively, eject ink in the positions for recording. A line head inkjet recording apparatus, which has the fixed heads and feeds the paper sheet in one constant direction, can print faster than a serial printer that records data by moving the head reciprocally in the direction orthogonal to the paper feed direction.

Figure 2:
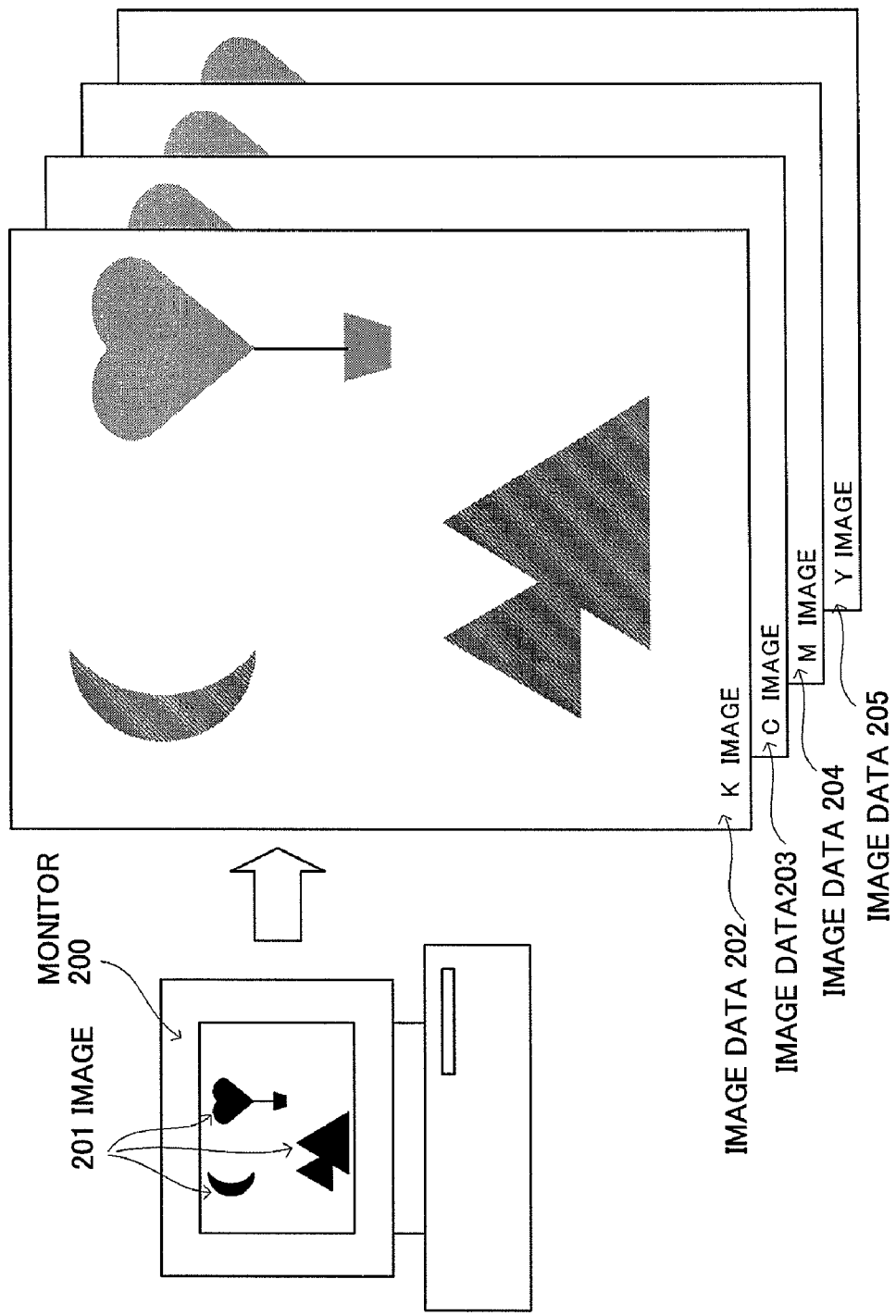
FIG. 2 is a diagram showing how an inkjet recording apparatus records data.

FIG. 2 is a diagram showing how an inkjet recording apparatus records data.

An image 201 is represented by color pixels, R(Red), G(Green), and B(blue), on a monitor 200 of an external device such as a PC or the like. To record this image 201 in an inkjet recording apparatus, the software (driver) performs color processing for the image 201 to convert it into four-color image data of K(black) 202, C(Cyan) 203, M(Magenta) 204, and Y(Yellow) 205 and transmits the converted image data to a recording apparatus (not shown) for recording thereon.

For example, for a part that is green on the monitor 200, the green color is reproduced on a paper sheet by ejecting ink from the C(Cyan) head and the Y(Yellow) head according to the duty value (density) for reproducing the color to be displayed on the monitor.

Figure 3:
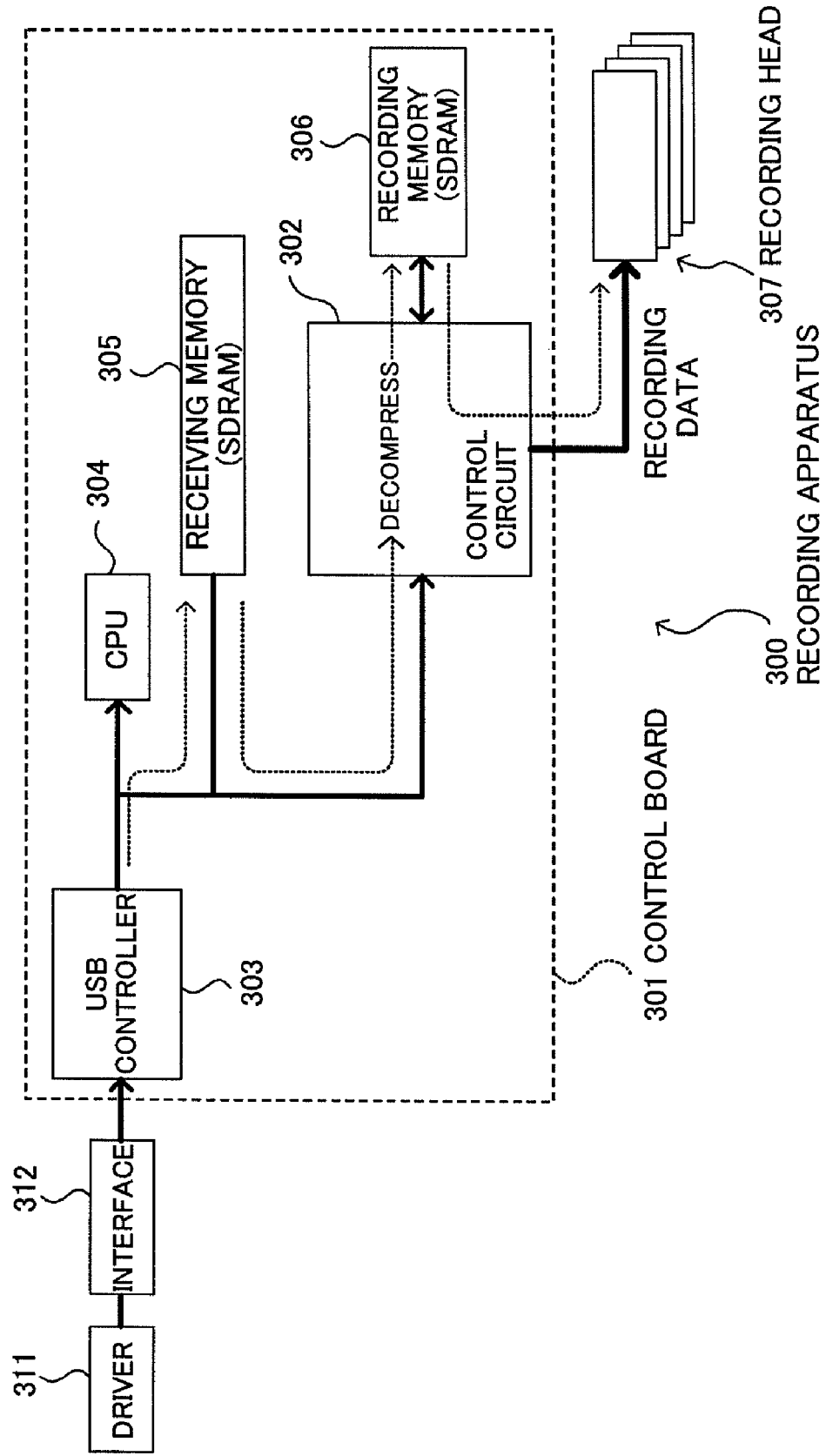
FIG. 3 is a diagram showing the transfer path of recording data.

FIG. 3 is a diagram showing the transfer path of recording data from an external device such as a PC to a recording apparatus. The external device such as a PC uses a driver 311 to change the recording data into compressed data and sends the compressed data to a recording apparatus 300 via an interface 312 such as a USB or the like.

The recording apparatus 300 receives the compressed data at a USB controller 303 via the interface 312 such as an USB. The USB controller 303 saves the received compressed data into a receiving memory 305 (SDRAM, etc.) via a CPU 304, decompresses the data in a control circuit 302 composed of a circuit such as an ASIC, and writes the decompressed image data into a recording memory 306 (SRAM, etc.) as recording data. After that, the control circuit 302 reads the recording data from the recording memory 306 and transfers it to a recording head 307 (corresponds to the numeral 100 in FIG. 1).

The recording head 307 has a register in which recording data is saved. When one line of recording data is received, the recording head 307 becomes ready for ejection. After that, ink is ejected at an appropriate time determined by the paper feed condition. The CPU and the circuit elements of the recording apparatus 300 are mounted on a control board 301. A line-head recording apparatus transfers data to the recording head 307, one line of recording data at a time.

Figure 4:
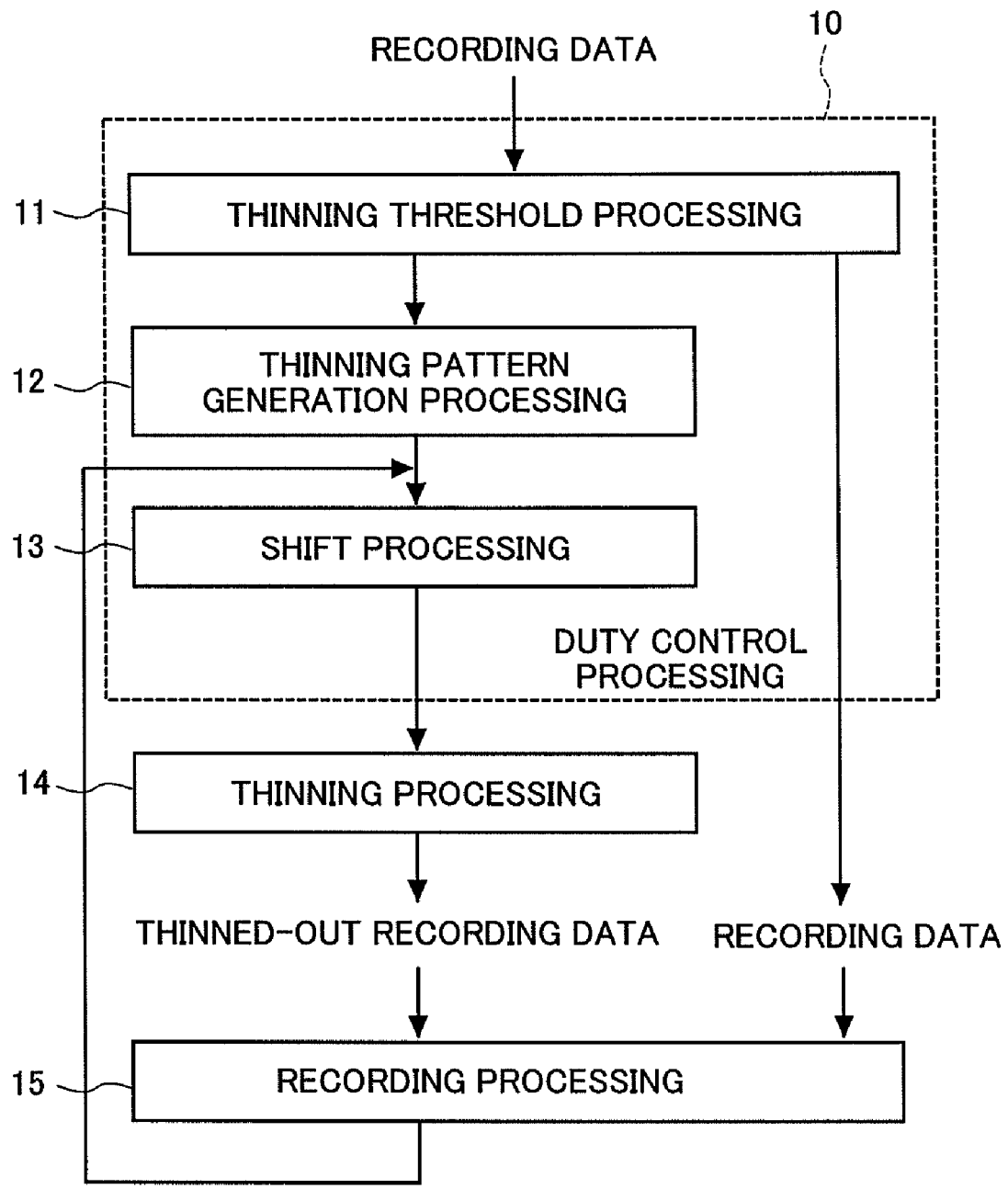
FIG. 4 is a diagram showing the thinning processing of the inkjet recording apparatus of the present invention.
Figure 5:
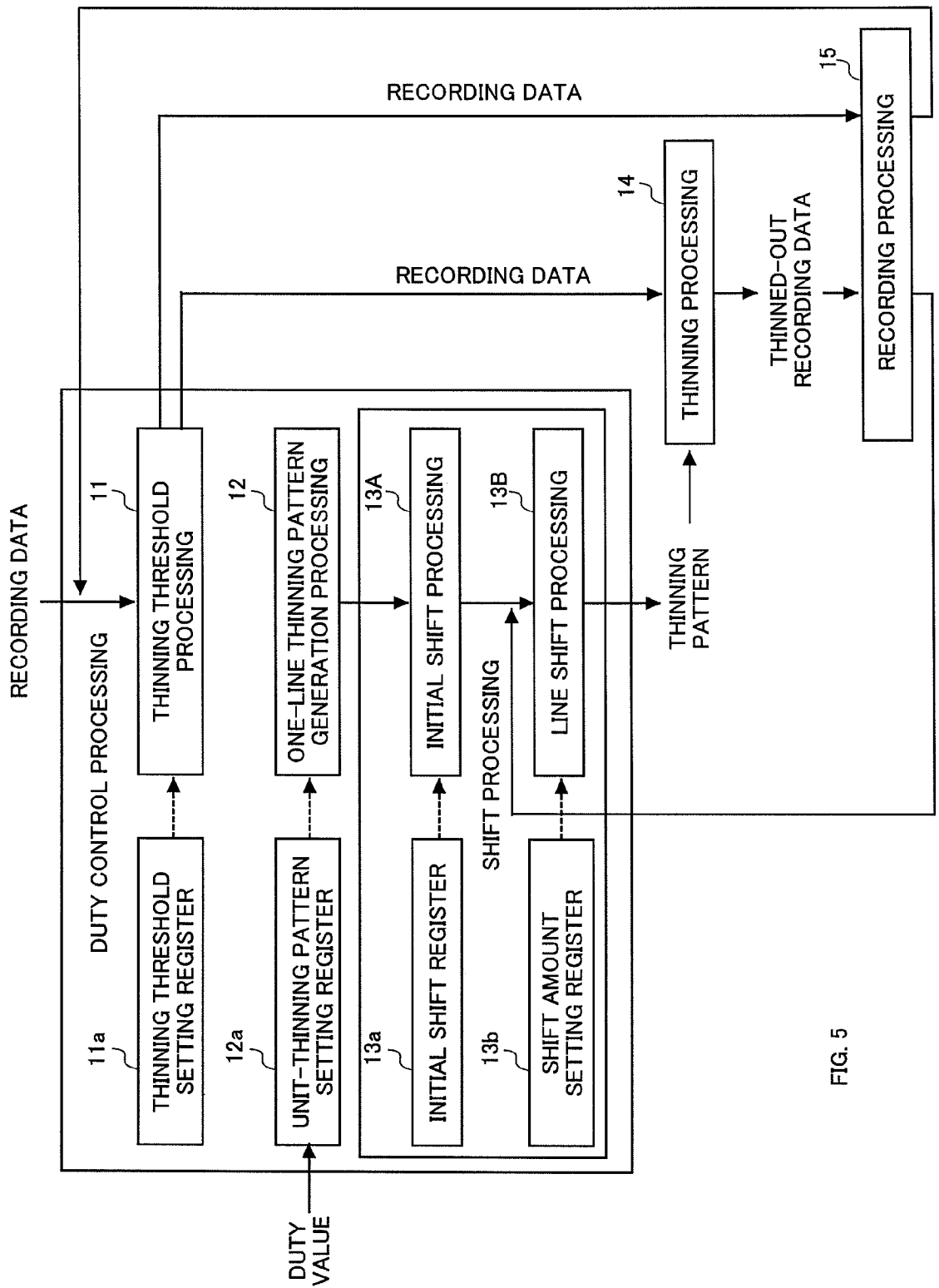
FIG. 5 is a diagram showing the thinning processing of the inkjet recording apparatus of the present invention.

Next, the following describes the thinning processing of the inkjet recording apparatus in an embodiment of the present invention with reference to FIG. 4 and FIG. 5.

When recording data is recorded, the inkjet recording apparatus in this embodiment performs the thinning processing as necessary via the duty control processing 10 and, when the thinning processing is performed, prevents image quality degradation that may be caused by the thinning processing.

FIG. 4 is a diagram showing the thinning processing of the inkjet recording apparatus in this embodiment. Referring to FIG. 4, the duty control processing 10 includes thinning threshold processing 11 that determines whether the recording data duty value is high and the recording is dense or the recording data duty value is low and the recording is coarse.

If it is found as the result of this thinning threshold processing 11 that the recording data duty value is high and the recording is dense, recording processing 15 is executed using recording data thinned out via the thinning processing 14. The duty control processing 10 includes thinning pattern generation processing 12 and shift processing 13 that are performed before the thinning processing 14. The thinning pattern generation processing 12 serves to generate a thinning pattern for use in the thinning processing 14. A thinning pattern that is generated can be determined based on the conditions such as the characteristics of images to be recorded or on the characteristics of a recording medium such as a paper sheet to be used for recording.

The shift processing 13 acts to shift the thinning pattern, generated by the thinning pattern generation processing 12, into the direction of the recording elements (nozzles) of the head, that is, into the direction of the recording width. This processing prevents recording degradation caused by the pattern characteristics of the thinning pattern. In addition, to prevent the same thinning pattern from being repeated on the lines in the paper feed direction, the shift processing 13 is performed again after the recording processing 15.

On the other hand, if it is found as the result of the thinning threshold processing 11 that the recording data duty value is low and the recording is coarse, the thinning processing 14 is not performed and the recording processing 15 is performed using the original recording data.

FIG. 5 is a block diagram showing the duty control processing 10, shown in FIG. 4, more in detail. As shown in FIG. 4, the duty control processing 10 includes the thinning threshold processing 11, the thinning pattern generation processing 12, and the shift processing 13.

First, the following describes the thinning threshold processing 11. In the duty control processing 10, the thinning threshold processing 11 checks the recording data to determine whether or not the thinning processing is to be performed; that is, it checks the recording data, arranged as a line in the recording width direction, to make a determination based on whether the recording dots are consecutive. That is, the thinning threshold processing 11 counts the number of consecutive ON pixels appearing consecutively in one line and compares the number of consecutive ON pixels with a pre-set thinning threshold. If the number of consecutive ON pixels is larger than the thinning threshold, the thinning threshold processing 11 determines that the recording dots are dense and the thinning processing should be performed. Based on this determination, the thinning threshold processing 11 sends the recording data to the thinning processing 14, applies a thinning pattern to the recording data to perform the thinning processing, and sends the thinned-out recording data to the recording processing 15 for recording.

On the other hand, if the number of consecutive ON pixels is smaller than the thinning threshold, the thinning threshold processing 11 determines that the recording dots are coarse and the thinning processing should not be performed. Based on this determination, the thinning threshold processing 11 sends the recording data directly to the recording processing 15 for recording.

A thinning threshold used for the thinning threshold processing 11 can be stored in a thinning threshold setting register 11a. The thinning threshold processing 11 reads a required thinning threshold from the thinning threshold setting register 11a for use in comparison processing. Any value may be set as the thinning threshold used for the comparison. For example, according to whether the recording content is character data or image data or according to the characteristics (e.g., moisture absorption characteristics) of the recording paper, an appropriate thinning threshold is selected from the thinning threshold setting register 11a and is set for the comparison.

Next, the following describes the thinning pattern generation processing 12. In the duty control processing 10, the thinning pattern generation processing 12 acts to generate a multiple-bit pattern that determines whether each bit of recording data is to be recorded or not. For a line printer, a thinning pattern is generated for one line. At this time, the thinning pattern generation processing 12 generates a thinning pattern for one line by arranging multiple unit-thinning patterns in the recording width direction.

A unit-thinning pattern is the minimum repetition unit, composed of multiple bits, with the number of bits set to a number smaller than the number of bit positions in one line. For example, the unit-thinning pattern is composed of about 20 bits.

Each bit of a unit-thinning pattern determines whether each bit of recording data, to which the pattern is applied, is to be recorded or not. Recording data corresponding to a bit, which specifies that the data is to be recorded, is recorded according to the value of the recording data; on the other hand, recording data corresponding to a bit, which specifies that the data is not to be recorded, is not recorded regardless of the value of the recording data.

The thinning pattern generation processing 12 acts to arrange a plurality of unit-thinning patterns in the recording width direction. This arrangement generates a one-line thinning pattern in which the unit-thinning pattern is repeated multiple times in the recording width direction.

The unit-thinning patterns used for the thinning pattern generation processing 12 can be stored in a unit-thinning pattern setting register 12a.

The thinning pattern generation processing 12 reads a unit-thinning pattern from the unit-thinning pattern setting register 12a and arranges this unit-thinning pattern multiple times in the recording width direction to generate a one-line thinning pattern. A unit-thinning pattern is read from the unit-thinning pattern setting register 12a based on the duty value of the recording data. The duty value of the recording data, which can be defined according to the drying characteristics of paper or ink or according to the reproducibility of colors, may be defined in advance according to the paper or may be set to any value by the user.

The thinning pattern generation processing 12 may also generate a thinning pattern in another mode. In this mode, a plurality of one-line thinning patterns are prepared, one for each duty value of recording data, and a duty value is stored in a register used as the parameter. With the duty value in this register as the parameter, a one-line thinning pattern may be generated by selecting one of the plurality of one-line thinning patterns.

Next, the following describes the shift processing 13. In the duty control processing 10, the shift processing 13 comprises initial shift processing 13A and line shift processing 13B. The initial shift processing 13A is to shift one thinning pattern, generated by the thinning pattern generation processing 12, by an initial shift amount, which differs among the multiple line heads, for each of the line heads to shift the thinning pattern among those line heads. The line shift processing 13B is to shift one thinning pattern, generated by the thinning pattern generation processing 12, or the thinning pattern, shifted by the initial shift processing 13A, into the right or left direction for each line of each of the multiple line heads to shift the thinning pattern among the lines.

The initial shift processing 13A has an operation unit that shifts the one-line thinning pattern into the recording width direction by a predetermined number of bits for each of the multiple line heads. This shift operation shifts the start position of the unit-thinning pattern in each line. This makes the start position of the unit-thinning pattern different among the multiple line heads and disperses the pattern among line heads with no identical patterns successively appearing in the feed direction.

It should be noted that the relative shift amount of the unit-thinning pattern among multiple line heads must not be set to an integral multiple of the length of the unit-thinning pattern. Because the thinning pattern is generated by repeating the unit-thinning pattern, an integral multiple of the length of the unit-thinning pattern, if set as the relative shift amount, would generate a regularly repeated pattern that is conspicuous. The shift direction may be in the right and/or left direction of the recording width direction.

The initial shift amount can be stored in an initial shift register 13a. As the initial shift amount, not only one common value may be stored in the initial shift register 13a for multiple line heads but also a different value may be stored for each line head. If one common value is stored in the initial shift register 13a as the initial shift amount, the initial shift value read from the register is multiplied by a predetermined coefficient to produce the shift amount of each line head. For example, the initial shift amount read from the register is used for shifting the pattern for the first line head, the twice the value read from the register is used for shifting the pattern for the second line head, and the three times the value read from the register is used for shifting the pattern for the third line head.

Note that the initial shift processing can be performed also in the thinning pattern generation processing, in which case, the position of the unit-thinning pattern in a line for each of the multiple line heads is shifted a predetermined number of bits into the recording width direction and, from that position, multiple unit-thinning patterns are arranged in the recording width direction to perform the initial shift processing similar to the one described above.

The line shift processing 13B has an operation unit that shifts the one-line thinning pattern a predetermined number of bits in the recording width direction when the next line of the same line head is recorded. This shifting makes the one-line thinning pattern for the same line head different among the lines. This prevents the degradation in recording caused by the same pattern arranged for the same head in the feed direction.

The shift amount of the line shift processing can be stored in a shift amount setting register 13b. As this shift amount, not only one common value may be stored in the shift amount setting register 13b for the multiple line heads but also a different value may be stored for each line head.

The thinning pattern, which is generated by the thinning pattern generation processing 12 and for which initial shifting and/or line shifting is performed by the shift processing 13, is sent to the thinning processing 14 where the thinning pattern is applied to the recording data to generate thinned recording data. The generated recording data is recorded on a paper sheet by the recording processing 15.

As described above, the thinning threshold processing 11 is repeated for all recording data to determine whether thinning is necessary. In addition, the line shift processing 13B, the thinning processing 14, and the recording processing 15 are repeated to prevent a regularly repeated loss in all recording data in the paper feed direction.

The duty control processing described above can be performed by a control circuit 302 in the recording apparatus 300. For example, the control circuit 302 may comprise various circuits (not shown), such as a memory control circuit, a data transfer processing circuit, and a heat timing control circuit, that control the print operation of the recording heads. Some of the circuits can be configured by semiconductor devices such as an ASIC and an FPGA (Field Programmable Gate Array: large-scale PLD).

Figure 6:
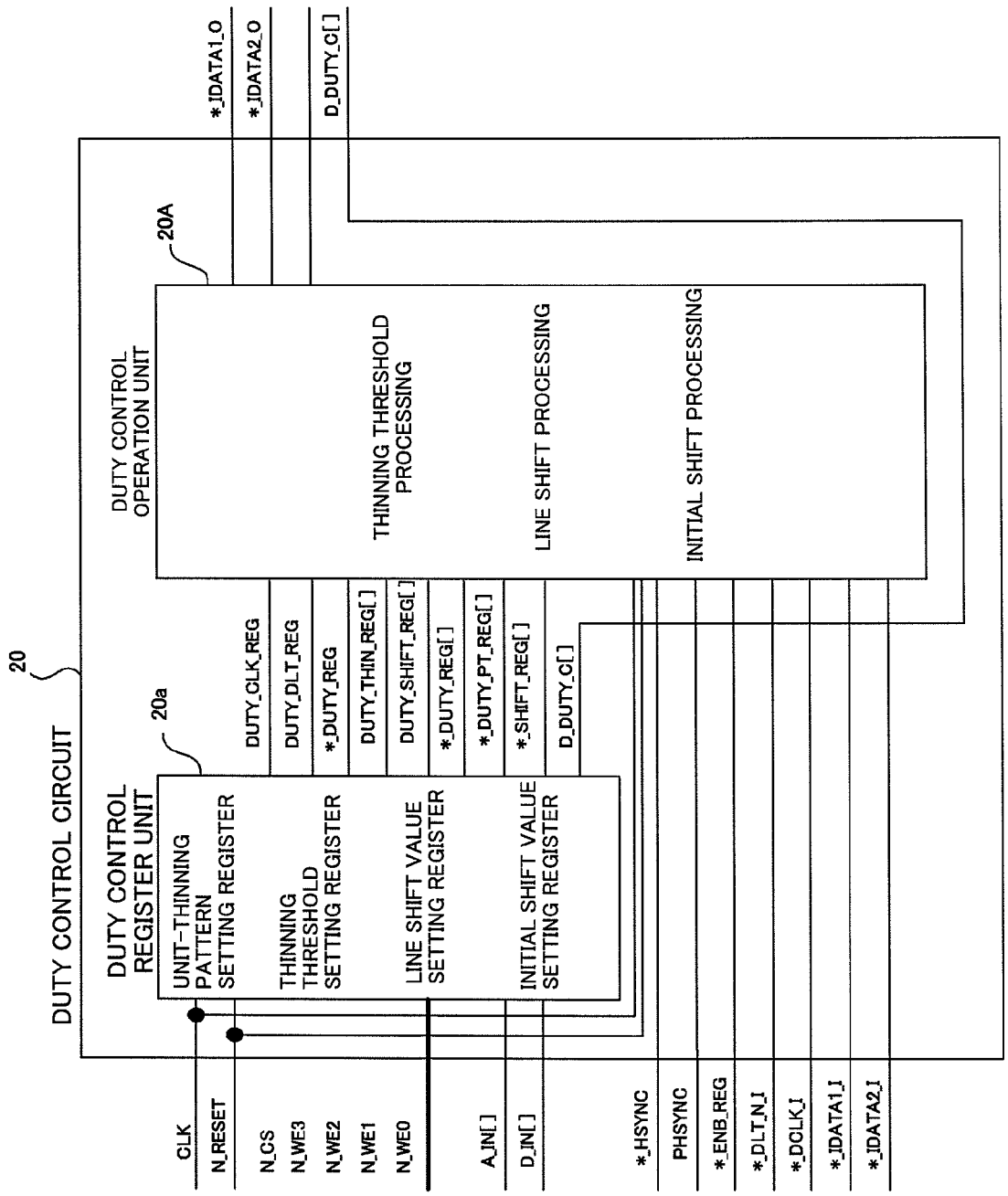
FIG. 6 is a diagram showing an example of a part of an internal circuit, such as an ASIC (Application Specific Integrated Circuit), included in the control circuit of the present invention.

FIG. 6 shows an example of a part of the internal circuit, such as an ASIC, included in the control circuit in this embodiment. This circuit shows an example of a duty control circuit 20 that performs the line shift function, the initial shift function, and the thinning threshold function.

As described above, the line-head inkjet recording apparatus transfers recording data to the heads, one line of the head at a time. In this embodiment, this characteristic is used to generate a thinning pattern.

Referring to FIG. 6, the duty control circuit 20 comprises a duty control register unit 20a and a duty control operation unit 20A.

The duty control register unit 20a corresponds to the registers shown in FIG. 5, that is, the thinning threshold setting register 11a, the unit-thinning pattern setting register 12a, the initial shift register 13a, and the shift amount setting register 13b. Those registers contain a thinning threshold, a unit-thinning pattern, and, for each head, an initial shift value and a line shift value, respectively.

The duty control register unit 20a receives the clock signal (CLK), the reset signal (N_RESET), the chip select signal (N_CS), and the write enable signal (N_WE3-N_WE0) from the CPU as the signals for connection with external blocks as well as the basic signals (A_IN, D_IN) required for the operation of the logical circuits such as the address bus and the data bus from the memory. Those registers are set to initial values or set by the CPU that executes the firmware to set a value specified by the user as necessary. In addition to those signals, the duty control register unit 20a receives signals (DUTY-_CLK_REG to D_DUTY_C[ ]), used for the duty control processing, as the signals for communication with the duty control operation unit 20A.

The duty control operation unit 20A performs the operation corresponding to the thinning threshold processing 11, the thinning pattern generation processing 12, the initial shift processing 13A, and the line shift processing 13B shown in FIG. 5.

The following signals are connected to this duty control operation unit 20A; that is, the timing signals (*_HSYNC, PHSYNC, *_ENB_REG, *_DLT_N_I) sent from other control circuit for recording, the data clock signal (*D_CLK_I) used to transfer recording data, the recording data input signals (*_IDATA1_I, *_IDATA2_I), and the signals (DUTY-_CLK_REG to D_DUTY_C[ ]) sent from the duty control register unit.

The duty control operation unit 20A outputs thinned recording data output signals (*IDATA10_0, *_IDATA2_0), and the duty control register unit 20a sends the duty value data (D_DUTY_C[ ]) to the recording data transfer circuit (not shown).

The following describes the generation of a thinning pattern with reference to FIG. 7-FIG. 10.

To generate a thinning pattern, a unit-thinning pattern composed of multiple bits (for example, 20 bits) is set first. FIG. 7 shows an example of a unit-thinning pattern.

A unit-thinning pattern may be set for each of the multiple line heads (color heads) or one pattern common to the heads may be set. One pattern common to the line heads reduces the required space in the internal circuits, such as an ASIC, and requires less memory, thus increasing the efficiency of the duty control processing.

The example in FIG. 7 shows the register setting values and the patterns for duty values (setting value in %). The register setting values are shown both in binary and in hexadecimal.

For example, to control the recording duty value in the range from 50% to 100% in increments of 5%, a multiple-bit unit-thinning pattern is set for each color head in the circuit such as an ASIC. In this example, a 20-bit unit-thinning pattern is set to control the recording duty value from 50% to 100% in increments of 5%. This 20-bit numeric value used in this example is the minimum numeric value required to represent the range 50% to 100% in increment of 5%, meaning that a 20-bit register can satisfy the condition described above.

For example, when the duty value of 100% is made correspond to non-thinned recording, the duty value of 50% is set in such a way that the 10 bits of the 20 bits are thinned out and the remaining 10 bits are not thinned out. The duty value of 50% shown in FIG. 7 corresponds to a pattern in which a thinning bit and a non-thinning bit appear alternately. Note that the duty value is an index value indicating how many bits are thinned out from the total of 20 bits. Which of the 20 bits are used as thinning bits can be set arbitrarily considering the thinning distribution within the unit-thinning pattern.

When the recording duty value is controlled in the range from 50% to 100% in increments of 5%, a register in which 20-bit thinning patterns are set is provided in the internal circuit such as an ASIC. In this register, the thinning patterns corresponding to the recording duty values, shown in FIG. 7, are set. When a duty value to be used for recording is set, the firmware sets this 20-bit thinning pattern in the unit-thinning pattern setting register 12a (FIG. 5).

In the example of 20 bits shown above, if the duty value is controlled in the range from 50% to 100% in increment of 10%, a 10-bit unit-thinning pattern and a 10-bit register are large enough as the pattern and the register.

The larger the register area in which a thinning pattern is stored is, the larger the size of the internal circuit such as an ASIC. In this embodiment, not a one-line thinning pattern but a unit-thinning pattern used to form a one-line thinning pattern is stored in the register. This configuration requires a smaller register area, reduces the circuit size, and reduces the cost.

If the circuit size is large enough, multiple patterns, each having the same recording duty value for each head, can be set to make the thinning patterns fully dispersed. This configuration, if used, requires a memory capacity according to the number of patterns that are set.

If thinning bits are not evenly distributed, the recording data could be thinned out in multiple adjacent bit positions. Such thinning processing leads to the degradation of quality of recorded images. To minimize degradation in the image quality of recording data that may be caused by the thinning processing, a unit-thinning pattern should be set in which the thinning bits are dispersed so that the recording data will not be thinned out in the adjacent bit positions.

A thinning pattern is formed by repeating a unit-thinning pattern for one line of a head. Therefore, if the leading side bits and the trailing side bits of this unit-thinning pattern are set as thinning bits, the consecutive thinning bits occurs, when the unit-thinning pattern is repeated, at the connection of the patterns. To prevent this, thinning data (or non-thinning data) is set in the first multiple bits of a unit-thinning pattern and non-thinning data (or thinning data) is set in the last multiple bits of the unit-thinning pattern to prevent the thinned-out pixels from occurring adjacently when the unit-thinning pattern is repeated to form a thinning pattern.

To prevent the thinned-out pixels from occurring adjacently, it is also possible to configure a unit-thinning pattern in which non-thinning data is set in first multiple bits and last multiple bits of the unit-thinning pattern. In this case, non-thinning data concentrate in the middle part of the unit-thinning pattern to satisfy the predetermined duty value, with the result that the image quality of recorded data is degraded.

Figure 8:
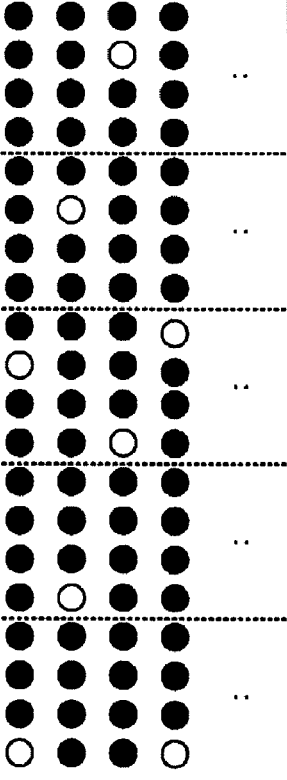
FIG. 8 is a diagram showing an example of different unit-thinning patterns used in the present invention that satisfy the same duty value.

FIG. 8 shows an example of different unit-thinning patterns that satisfy the same duty value. In the example in the figure, the duty value is 90%. If the register capacity is large enough, two or more different unit-thinning patterns satisfying the same duty value are prepared to allow one of them to be selected as necessary. This method prevents the image quality from being degraded by regularity introduced by using the same thinning pattern. This method for selecting among different unit-thinning patterns may be used not only when one line is configured by but also when the same unit-thinning pattern is used for one line but different unit-thinning patterns are used for different lines.

Figure 9:
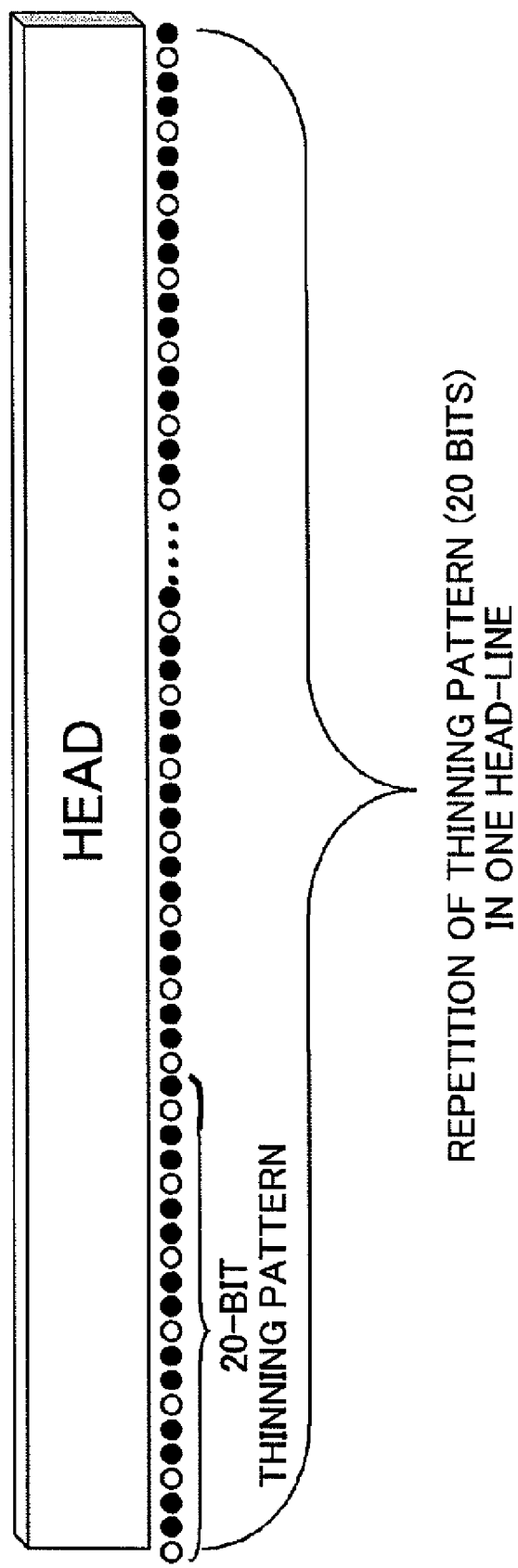
FIG. 9 is a diagram showing an example in which one line of thinning pattern is formed in the present invention by repeating a unit-thinning pattern.

FIG. 9 schematically shows an example of a 20-bit unit-thinning pattern repeated to form a one-line thinning pattern. A line head applies a thinning pattern to received recording data as a mask to form recording data for which the line head is to be driven. For example, if a recording data bit position matches a thinning bit position of the thinning pattern, the bit position is made unavailable for recording; conversely, if a recording data bit position matches a non-thinning bit position of the thinning pattern, the bit position is made available for recording. In this way, thinned-out recording data is formed.

Figure 10:
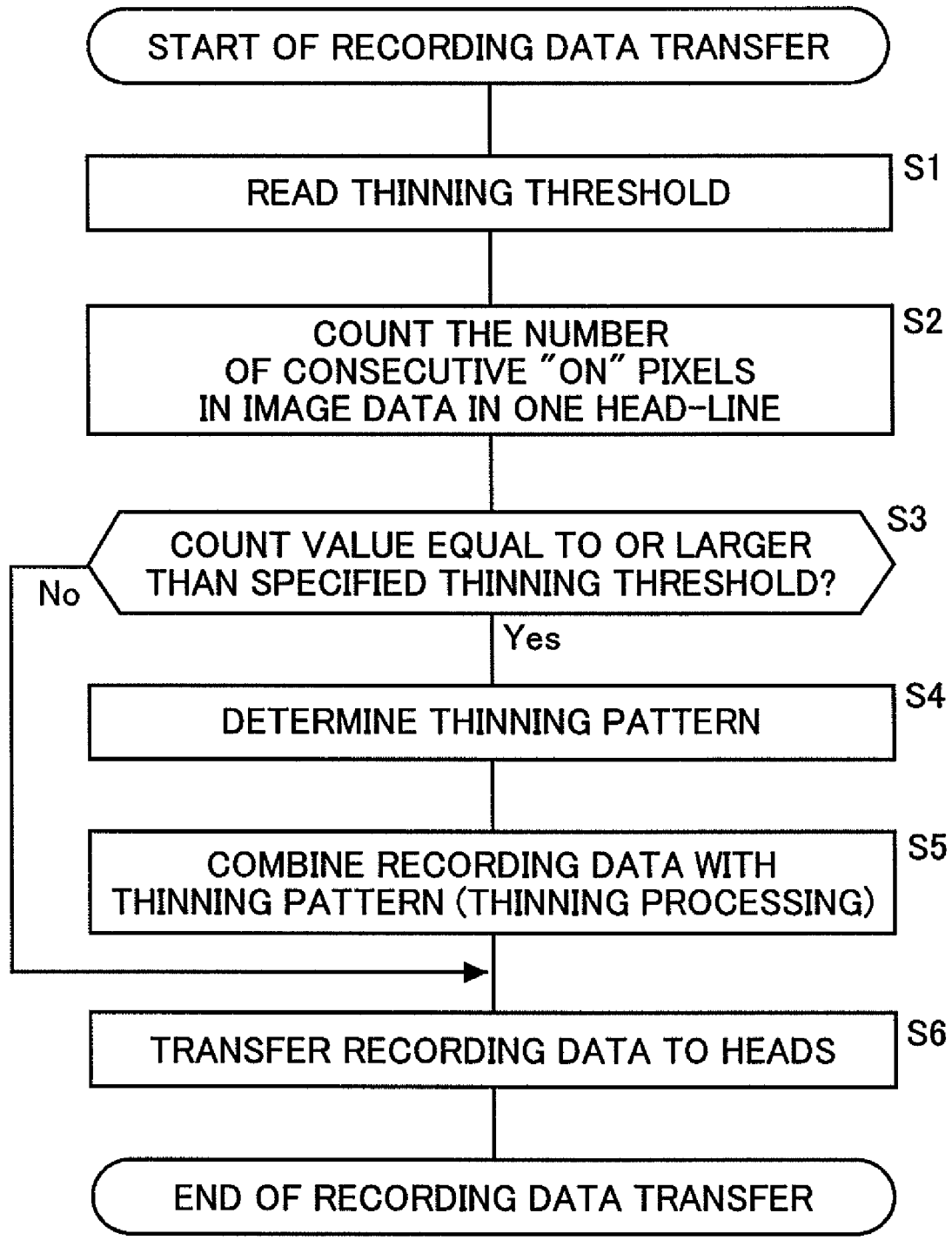
FIG. 10 is a flowchart showing thinning processing performed by a duty control circuit of the present invention.

FIG. 10 is a flowchart showing the thinning processing performed by the duty control circuit 20 (FIG. 6). The CPU reads the programs, stored in the recording medium such as a flash ROM, for executing the processing shown in the flowchart.

Referring to the flowchart in FIG. 10, the thinning threshold processing 11 reads a thinning threshold from the thinning threshold setting register 11a after recording data is transferred (S1). The thinning threshold processing 11 counts the number of consecutive ON pixels in the one-line recording data in the received recording data (S2).

The number of consecutive ON pixels counted in S2 is compared with the thinning threshold obtained in S1. The result of this comparison is used to determine whether to perform the thinning processing (S3).

To perform the thinning processing, the thinning pattern is determined (S4), the determined thinning pattern and the recording data are combined to perform the thinning processing (S5), and the combined recording data is transferred to the head (S6). If it is determined, as the result of the processing in S3, that the thinning processing is not performed, the recording data is transferred to the head without performing the thinning processing (S6). The following describes the thinning threshold function.

Figure 11:
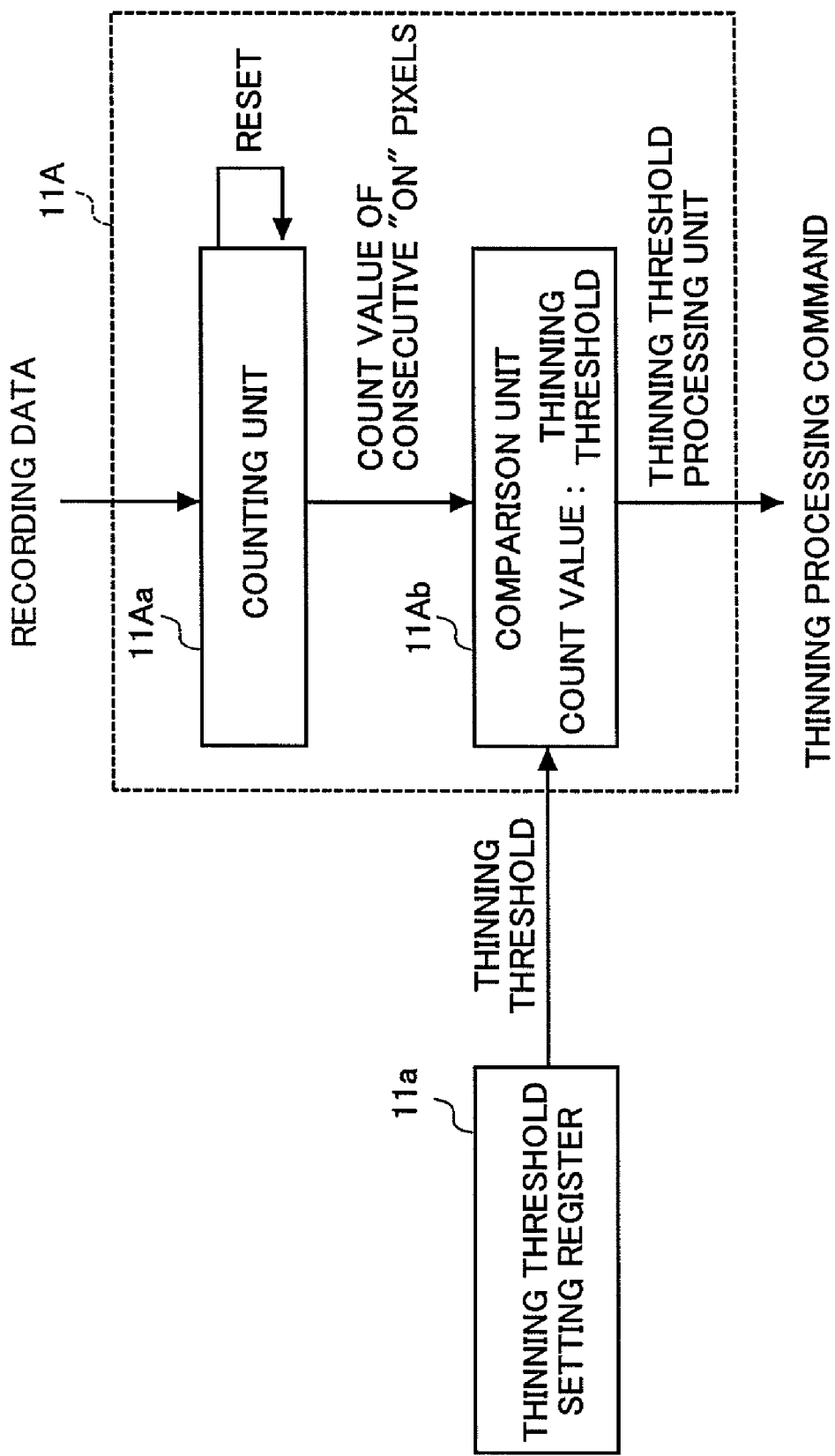
FIG. 11 is a block diagram showing an example of the configuration of the thinning threshold processing of the present invention.

FIG. 11 is a block diagram showing an example of the configuration of the thinning threshold processing. Referring to FIG. 11, a thinning threshold processing unit 11A has the following components in the duty control circuit 20: a counting unit 11Aa that counts the number of consecutive ON dots in recording data, the register 11a in which a threshold used to determine whether to perform thinning is stored, and an operation unit 11Ab that compares a specified register value with a count value.

When recording data is transferred from the recording memory to the head via the control circuit, the counting unit 11Aa counts the number of consecutive ON pixels in the recording data that is transferred for one line of a head. For example, when the recording data "111110000110" is counted, the counting unit 11Aa, which counts the number of consecutive ON pixels in the recording data, counts "1" five times and, upon detecting "0" that appears next, resets the counting unit 11Aa. After that, if "0" appears consecutively, the counting unit 11Aa stays reset. After that, the counting unit 11Aa counts "1" twice and, upon detecting "0", resets the counting unit 11Aa. Note that "1" corresponds to data to be recorded and "0" corresponds to data not to be recorded.

The counting unit 11Aa counts the number of consecutive dots (ON pixels) as described above. The comparison unit 11Ab compares the count value counted by the counting unit 11Aa with the thinning threshold read from the thinning threshold setting register 11a and, if the count value is equal to or larger than the thinning threshold, issues a thinning command to perform the thinning operation.

As the result of this processing, it is possible to determine whether the thinning processing is to be performed or not, one head line at a time.

FIGS. 12A-12C are diagrams showing the thinning threshold processing. In FIG. 12A, a dark background part represents a part where data is recorded and a light background part represents a part where data is not recorded. The bottom line in the feed direction indicates a line where the thinning threshold is set to a value equal to or larger than 7, that is, a line where no thinning is practically performed. The figure shows an example in which the thinning processing is performed for the lines with the thinning threshold decreased sequentially (6, 5, 4, and 3) in the upstream of the feed direction. When the thinning processing is performed for a part where data is recorded, the recording data is thinned out according to the thinning pattern. A white part in the recorded part indicates a bit part where the bit data is thinned out and not recorded.

That is, in FIG. 12A, assume that a white part is where no data is recorded and the thinning threshold is set, for example, to "4". In this case, the thinning processing is not performed in the recording width direction, not for the recording data in which three or less consecutive ON pixel dots appear, but for the recording data in which four or more consecutive ON pixel dots appear.

FIG. 12B shows an example in which the thinning threshold is set to "1". In this case, each bit (a unit of one "1" and one "0" of data clocks) is checked and, if the input image data is "1" and the thinning pattern is "0", "1" in the input image data is thinned out and the output image data becomes "0". This state is represented in the FIG. 12B as a "thinned out position".

If the input image data is "1" and the thinning pattern is "1", "1" in the input image data is not thinned out and the output image data remains "1". If the input image data is "0", the output image data is "0" regardless of the value of the thinning pattern.

FIG. 12C shows an example in which the thinning threshold is set to "3". As in FIG. 12B, each bit (a unit of one "1" and one "0" of data clocks) is checked and, if the thinning pattern is 0 for an area where three or more bits of the input image data are consecutively "1", "1" in the input image data corresponding to "0" in the thinning pattern is thinned out and the output image data becomes "0". This state is represented in the FIG. 12C as a "thinned out position".

If the thinning pattern is "1" in the area described above, "1" in the input image data is not thinned out and the output image data remains "1". If the input image data is "0", the output image data is "0" regardless of the value of the thinning pattern.

In the part A in FIG. 12C, because the number of consecutive ON pixels in the input image data is "2", no data is thinned out in this area.

This thinning threshold can reduce degradation in the image quality caused by a barcode-like pattern produced by thinning out thin straight lines in the feed direction.

Next, the following describes the line shift function that is one of the shift functions.

Generating recording data using a thinning pattern, which thins out data always in the same bit positions in each line, for each head would generate white lines each aligned in the feed direction, causing degradation in the image quality of a duty controlled image.

To solve this problem, the line shift processing circuit acts to shift the thinned-out recording data a predetermined number of bits when the head records the next line to prevent data from being thinned out in the same bit positions.

Figures 13A, 13B, 13C:
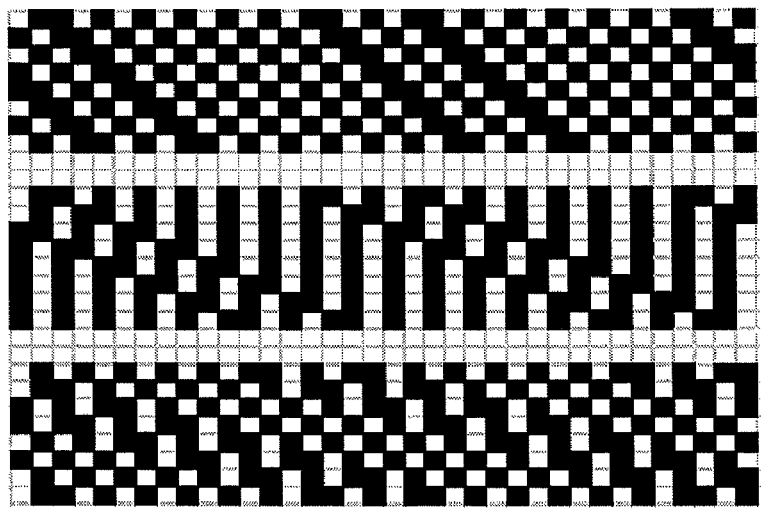
FIGS. 13A-13C are diagrams showing the line shift processing of the present invention.

FIG. 13 shows an example in which the lines are shifted using the line shift amount of one bit, two bits, and three bits when the recording duty value is set to 60%. The thinning pattern used in this example is the pattern shown in FIG. 7 whose duty setting value is 60%. For example, in FIG. 13A, even if the recording duty value is the same, the adjacent thinned-out pixels in the feed direction can be eliminated by shifting the lines with the line shift setting value set to one bit.

FIG. 13B shows an example in which the lines are shifted with the line shift setting value set to two bits. In this case, though the generation of white lines in the feed direction can be prevented, oblique-direction regularity appears and, depending upon the recording data, white lines tend to be generated in the oblige direction.

FIG. 13C shows an example in which the lines are shifted with the line shift setting value set to three bits. In this case, the oblique-direction regularity generated in FIG. 13B can be reduced.

The line shift processing circuit, for which a line shift setting value is set according to the characteristics of an image, can prevent the degradation of image quality.

Next, the following describes the initial shift function.

The line shift described above shifts a thinning pattern when the same head records the next line, while the initial shift shifts the start position of the thinning pattern right or left for each of the multiple heads. Note that the multiple heads may be the heads of different colors or the same color.

This processing, once set at the start of recording, keeps the setting value until the end of recording.

The initial shift register value for each head is stored in the duty control circuit 20. When recording is started, the initial shift generates a thinning pattern for each of the heads by shifting one head-line of the thinning pattern, generated from the unit-thinning pattern, right or left the specified number of bits.

Although it is also efficient to prepare different unit-thinning patterns for each of the heads from the beginning, this method requires unit-thinning patterns, one for each head. To avoid this, the same unit-thinning pattern is used in common for a thinning pattern for multiple recording heads, and this same common unit-thinning pattern is shifted the specified number of bits to generate thinning patterns to efficiently reduce the capacity and the circuit size required for register setting. Like the line shift, the initial shift may be performed for one line-head of a thinning pattern or may be performed when a unit-thinning pattern is generated.

For use when the thinning pattern for the next line is generated, the circuit, such as an ASIC, may have a register in which the line shift amount is stored for specifying the shift amount of the start position of one-line thinning pattern. When the line to which the thinning pattern is applied is changed to the next line, the start position of one head-line of the thinning pattern, generated by repeating the unit-thinning pattern, is shifted left or right the specified number bits specified as the line shift setting value. This processing is executed until the end of recording.

This line shift function is executed by the line shift processing circuit in the duty control circuit 20. The line shift is performed for one head-line of thinning pattern in the description above. Instead, when a specified multiple-bit thinning pattern is repeated during the generation of a unit-thinning pattern, it is also possible as described above to shift the start position of the thinning pattern and repeat the thinning pattern for one head-line for generating thinned-out recording data. In this way, thinned recording data in which the thinning position differs from line to line can be generated.

The following describes multiple modes in which a unit-thinning pattern is repeated to form a one-line thinning pattern which is then shifted to form a thinning pattern for use in recording.

Figure 14:
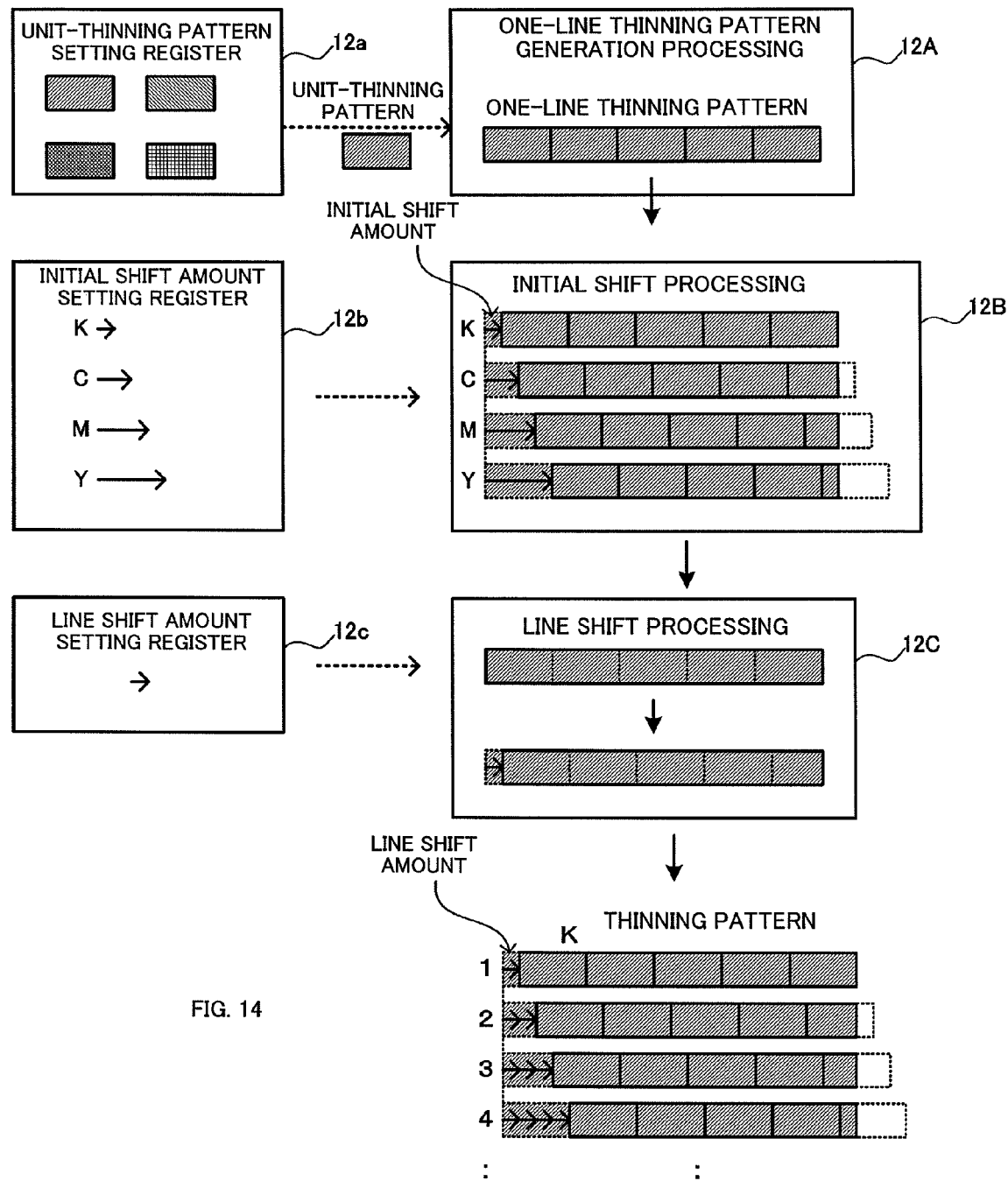
FIG. 14 is a diagram showing how a thinning pattern is generated from a unit-thinning pattern in a first mode of the present invention.

In a first implementation, one-line thinning pattern processing 12A is performed by arranging a unit-thinning pattern, selected from the unit-thinning pattern setting register 12a, in the recording width direction as shown in FIG. 14.

The generated one-line thinning pattern is shifted based on the initial shift amount of each head that is set in an initial shift amount setting register 12b. Although the pattern is shifted right in the example shown in the figure, it is also possible to shift the pattern left or to shift the pattern right or left for each head. The shift amounts are set so that the size of each shifted thinning pattern is not an integral multiple of the unit-thinning pattern.

Next, the one-line thinning pattern of each head, for which the initial shift has been performed, is shifted by the line shift amount that is set in a line shift amount setting register 12c. FIG. 14 shows the thinning patterns of the K head, one of the color heads, generated by shifting the pattern between lines.

Figure 15:
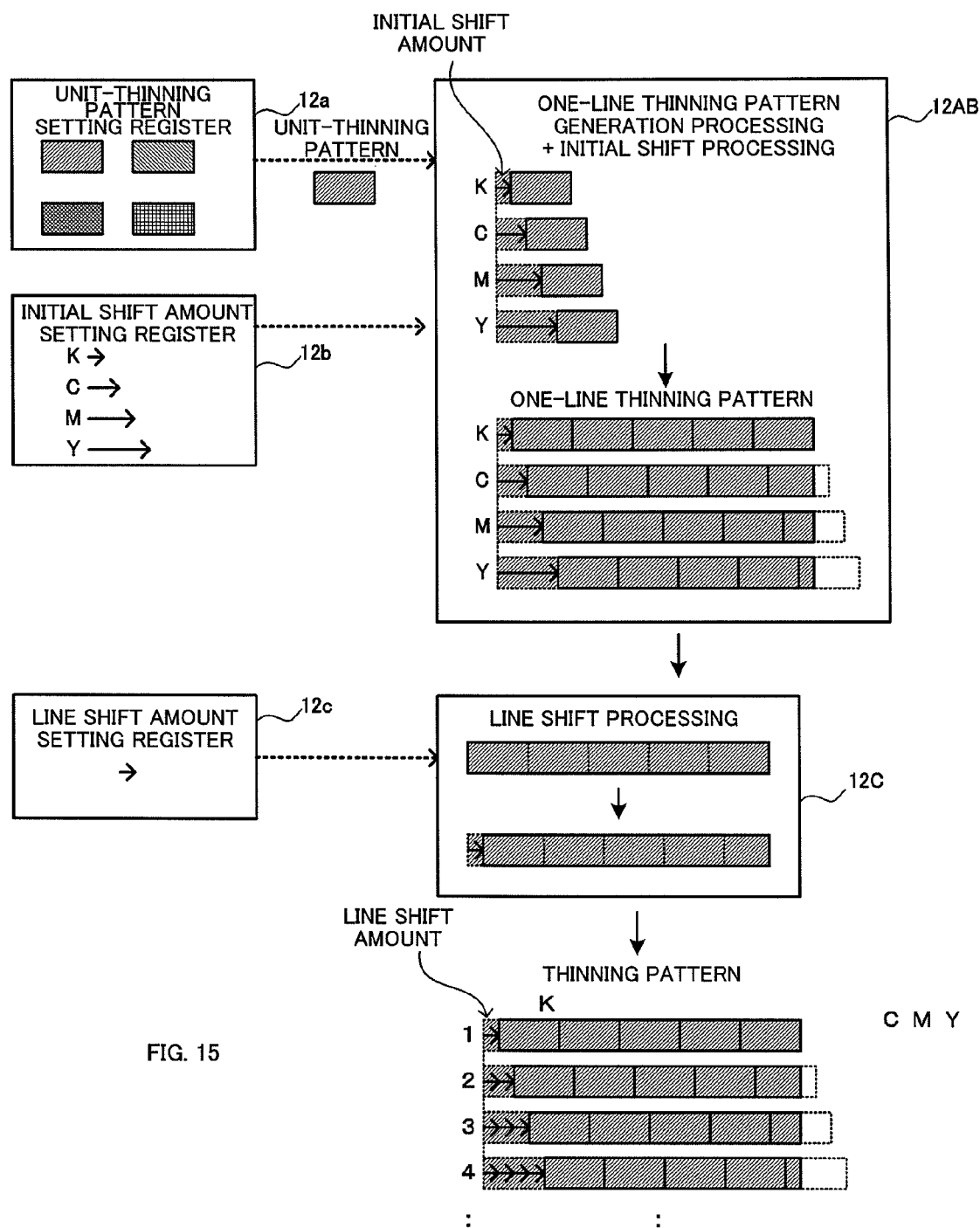
FIG. 15 is a diagram showing how a thinning pattern is generated from a unit-thinning pattern in a second mode of the present invention.

In a second implementation, the start position of a unit-thinning pattern, selected from the unit-thinning pattern setting register 12a, is shifted as shown in FIG. 15 based on the initial shift amount of each head that is set in the initial shift amount setting register 12b and, from this start position, the unit-thinning pattern is arranged in the recording width direction to generate one line thinning pattern. In FIG. 15, thinning pattern processing 12AB is a combination of the generation processing and the initial shift processing of this thinning pattern.

Next, the one-line thinning pattern of each head is shifted by the line shift amount that is set in the line shift amount setting register 12c. FIG. 15 shows the thinning patterns of the K head, one of the color heads, generated by shifting the pattern between lines.

Figure 16:
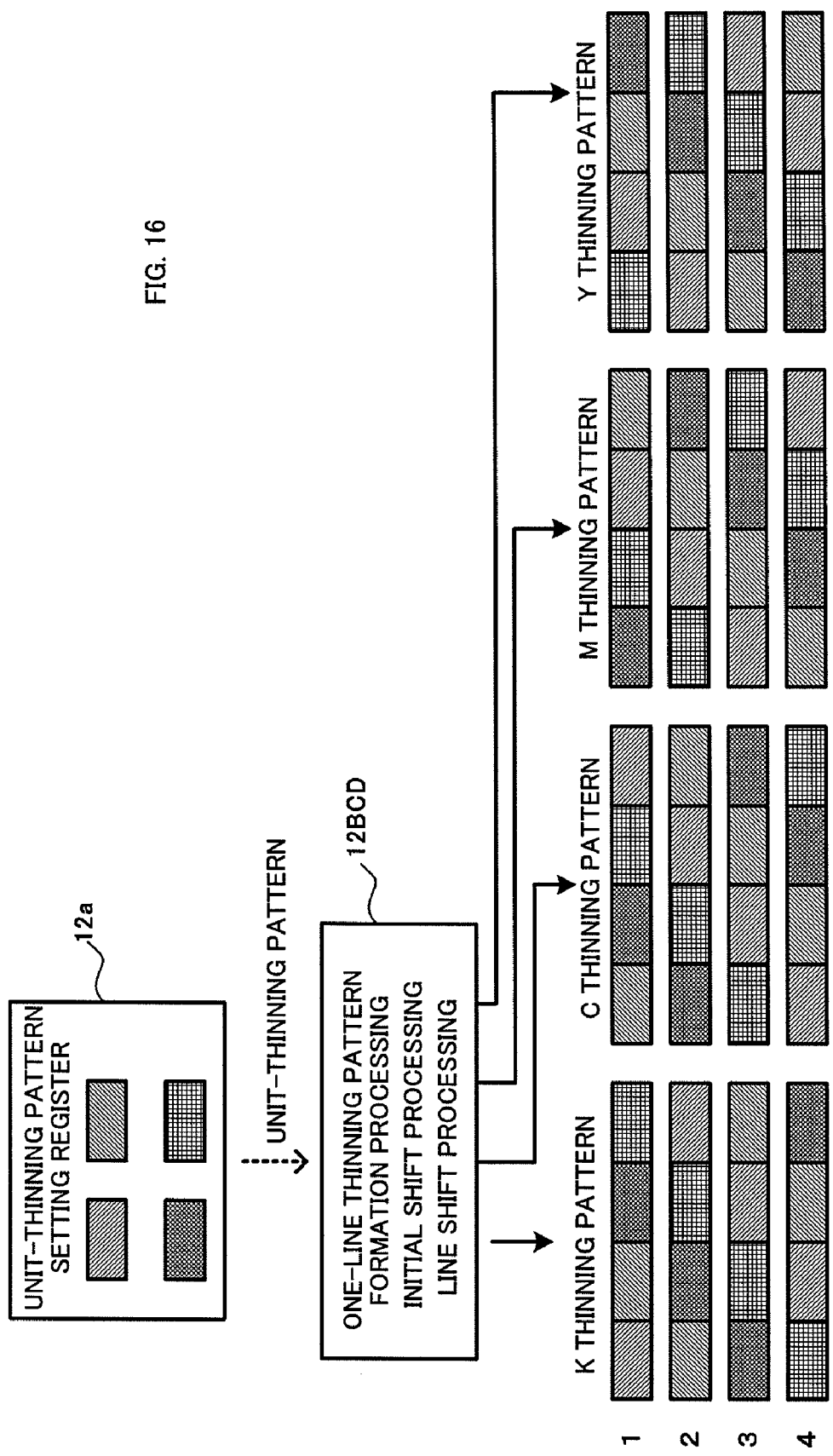
FIG. 16 is a diagram showing how a thinning pattern is generated from a unit-thinning pattern in a third mode of the present invention.

In a third implementation, multiple unit-thinning patterns are selected from the unit-thinning pattern setting register 12a as shown in FIG. 16, and the thinning patterns are generated while randomly changing the arrangement sequences of those multiple unit-thinning patterns in the recording width direction. The initial shift processing and the line shift processing are performed at the same time to generate thinning patterns that differ among lines.

Figure 17:
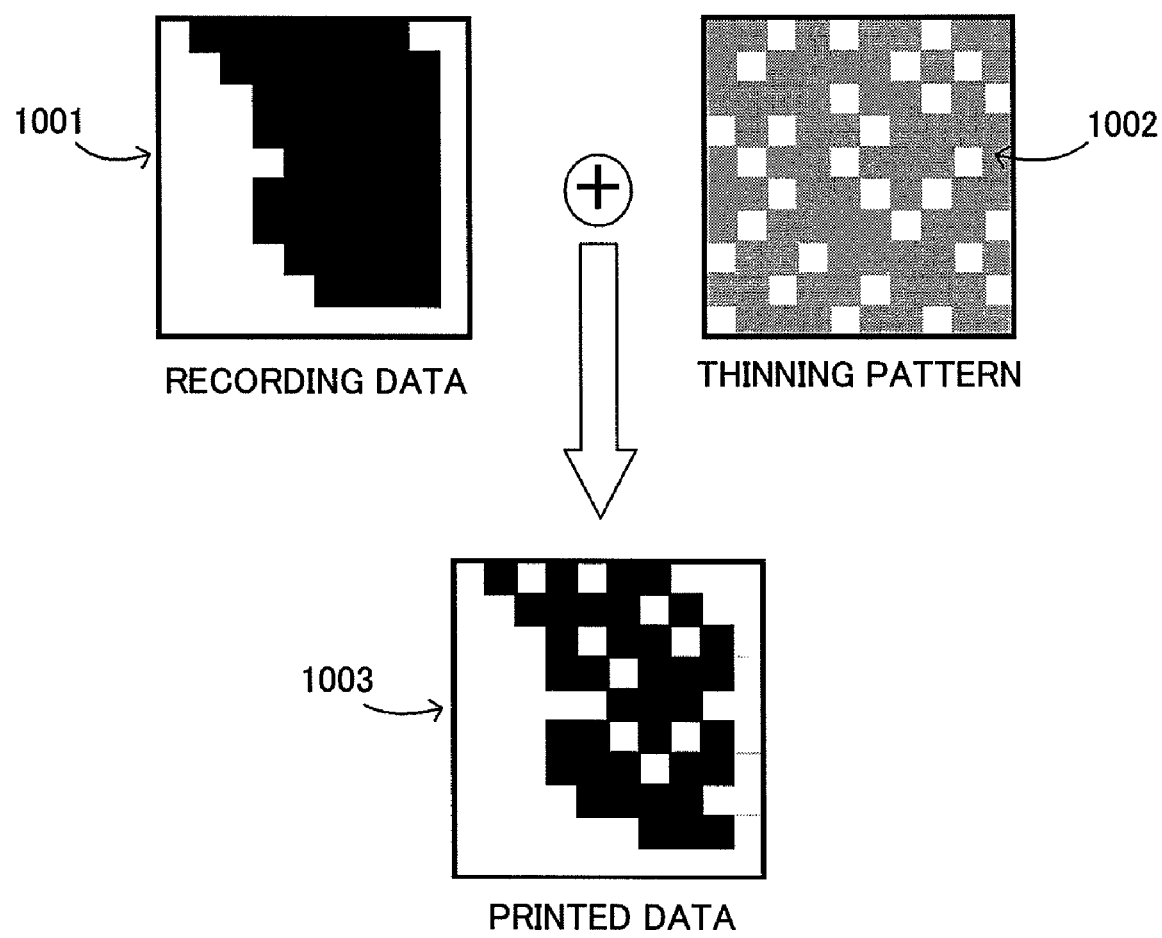
FIG. 17 is a diagram showing how recording data and a thinning pattern are combined in the present invention.

FIG. 17 is a diagram showing how recording data and a thinning pattern are combined. If the number of consecutive ON pixels is equal to or larger than the thinning threshold and it is determined that thinning processing is to be performed, recording data 1001 and a thinning pattern 1002 are combined (thinning processing is performed) as shown in FIG. 17 and recording data 1003 is transferred to the heads. This combination processing is performed for each line.

Next, another form of the inkjet recording apparatus in this embodiment will be described.

Figure 18:
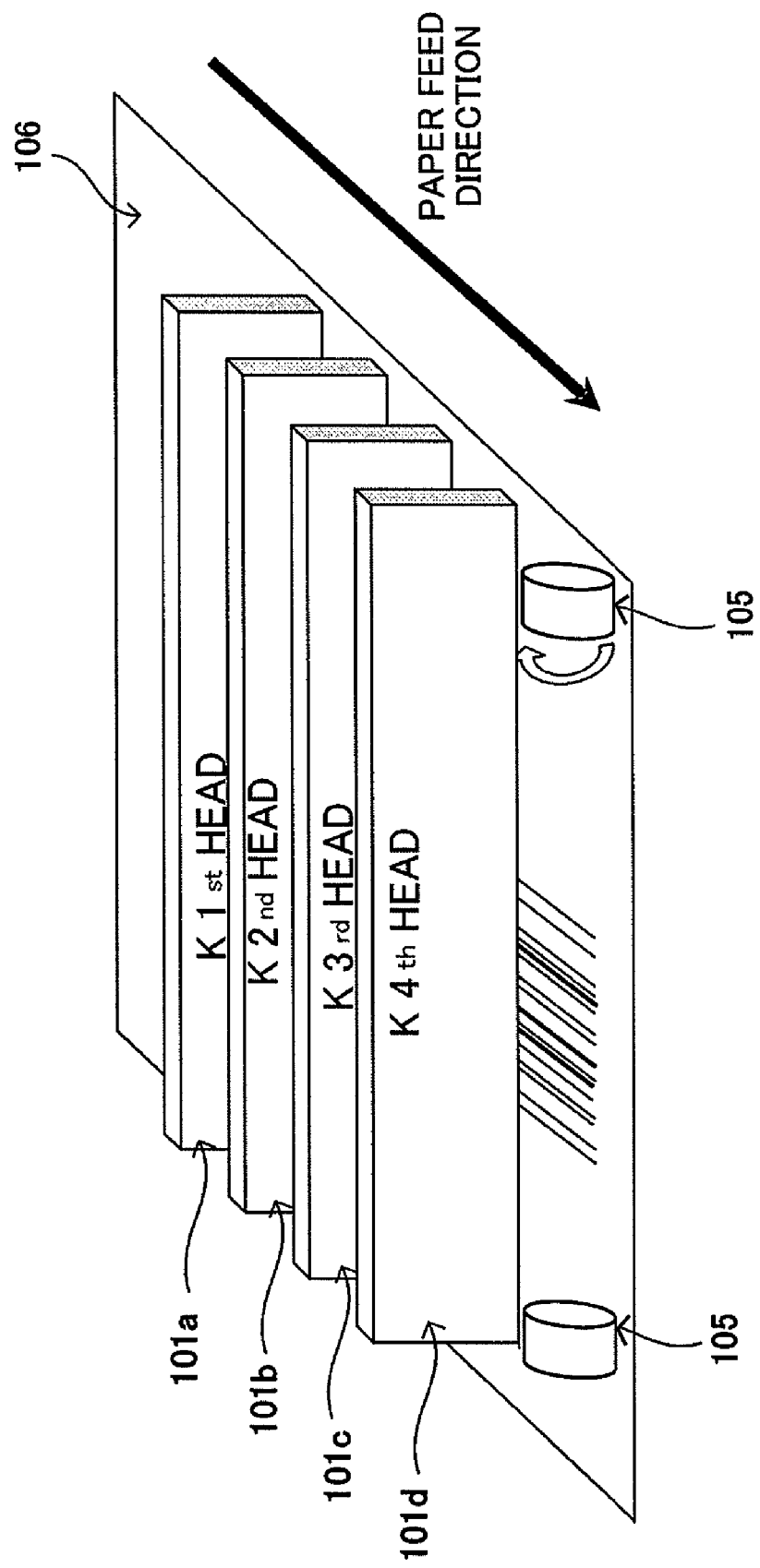
FIG. 18 is a diagram showing a second form of the present invention.

FIG. 18 is a diagram showing a second form of this embodiment. In the second form, the same-color heads are arranged in the feed direction of the inkjet recording apparatus to allow the heads to be driven at the same time for high-speed recording.

Referring to FIG. 18, the inkjet recording apparatus has four lines heads, 101a-101d corresponding respectively to K1st, K2nd, K3rd, and K4th, to record data in the same color. For example, the four heads 101a-101d that record data in black ink are arranged, and the heads 101a-101d are driven at the same time for recording. During this head driving, each head need only to eject ink every fourth line, meaning that the data transfer speed and the possible driving frequency of the head are apparently four times as high as those of one-head recording. Therefore, as compared with one-head recording, data can be recorded four times faster.

Figure 19:
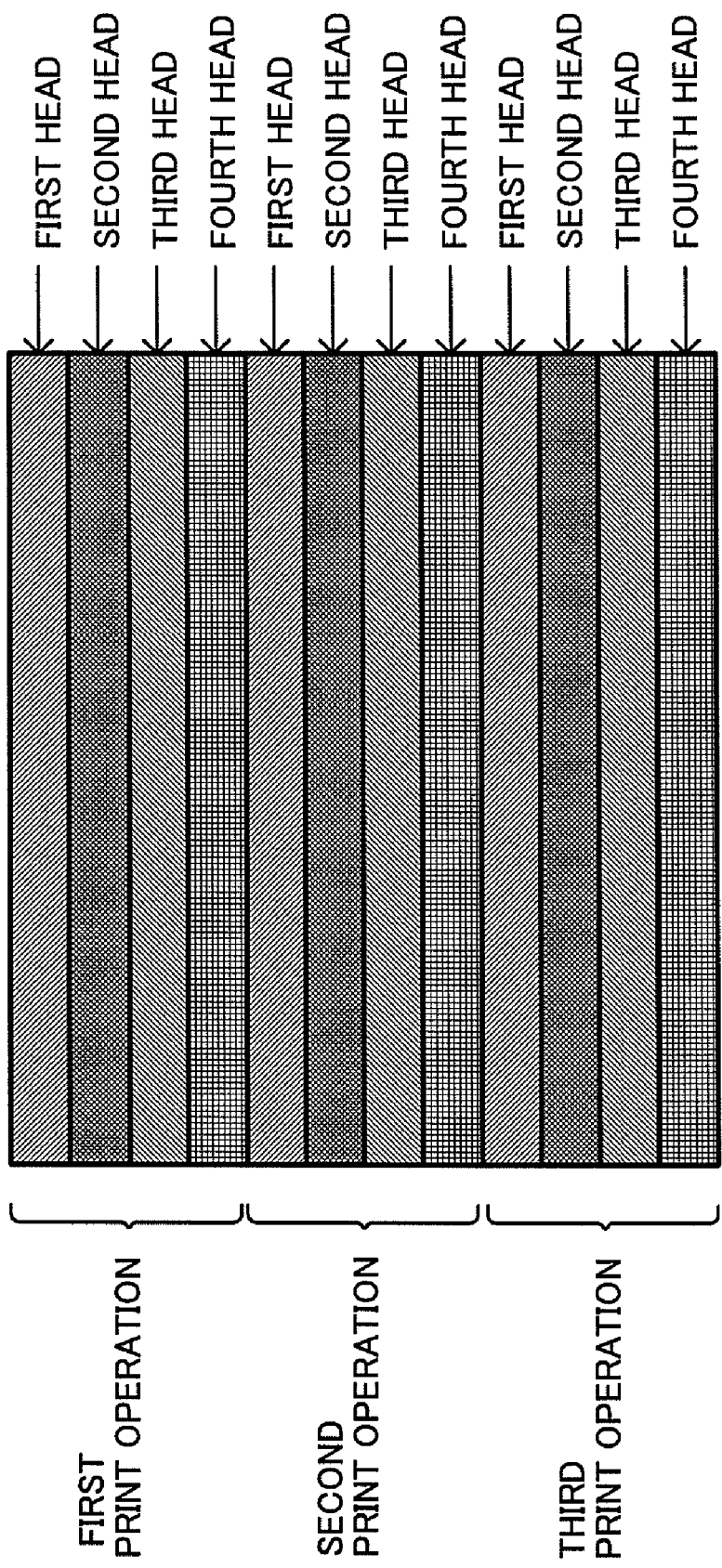
FIG. 19 is a diagram schematically showing an example of a recording operation in the second form of the present invention.

FIG. 19 is a diagram schematically showing an example of the recording operation in the second form. In each recording operation, the four heads record four lines at the same time. Therefore, three recording operations, the first to the third, can record 12 lines of data.

Figure 20:
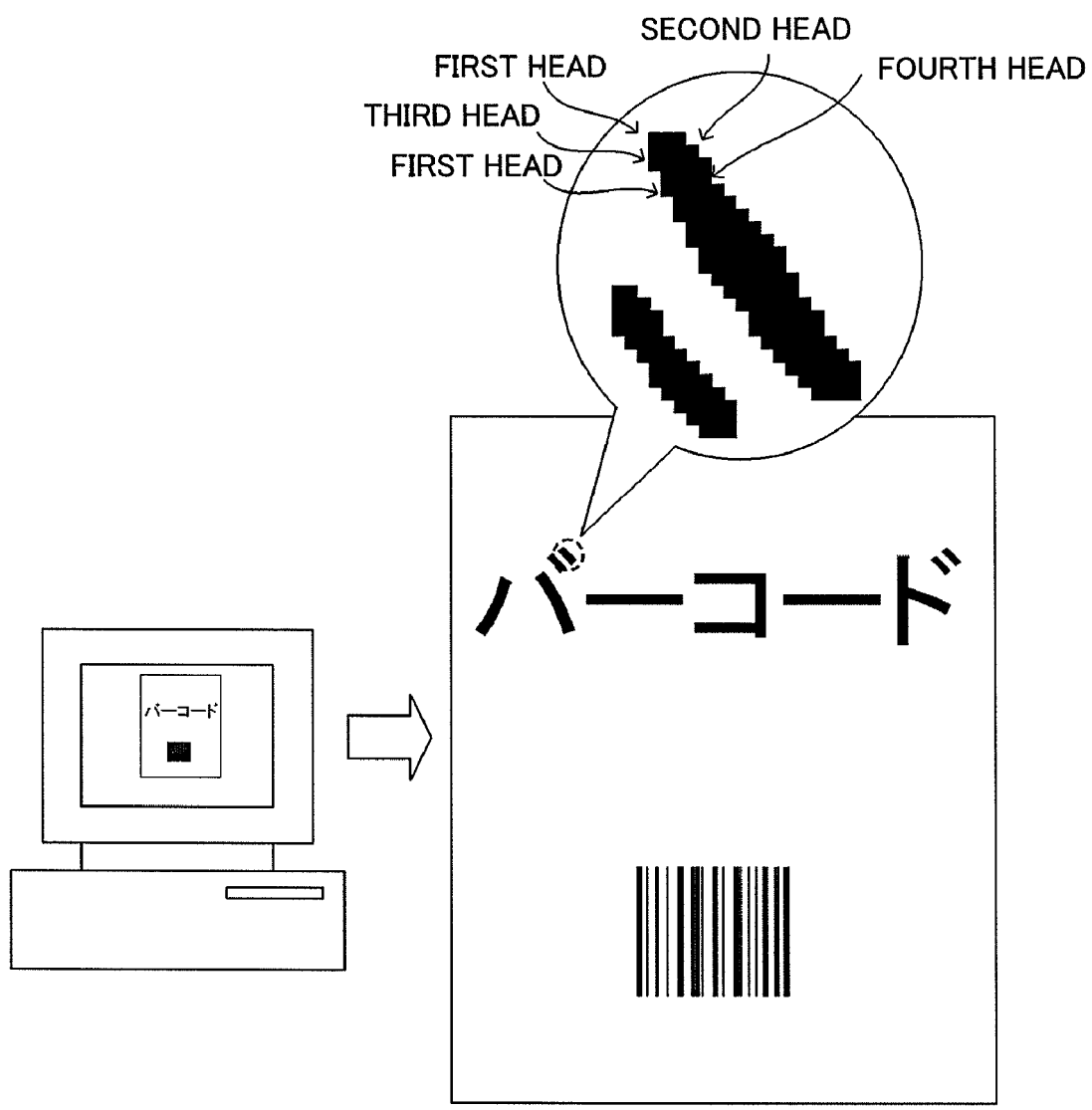
FIG. 20 is a diagram showing an enlarged part of a recorded page in the second form of the present invention.

FIG. 20 shows an enlarged part of a recorded page. In FIG. 20, the first line is recorded by the black K1st head and the second line is recorded by the K2nd head and, similarly, the third and fourth lines are recorded by the K3rd and K4th heads. In addition, the fifth line is recorded again by the K1st head.

In this recording method in which the four line heads of the same color are used, each of the recording heads records data every fourth line and the lines are recorded by the heads that are changed sequentially. Thus, in selecting a thinning pattern for use in the duty control, the thinning pattern to be used for each head must be carefully decided.

That is, in the second form, after one head records data and before the same head records data next time, the other heads records data. Therefore, when selecting a thinning pattern for one head, the thinning patterns applied to the heads used for the immediately preceding and following recording must be considered. The thinning pattern should therefore be produced by combining the initial shift processing with the line shift processing.

Figure 21:
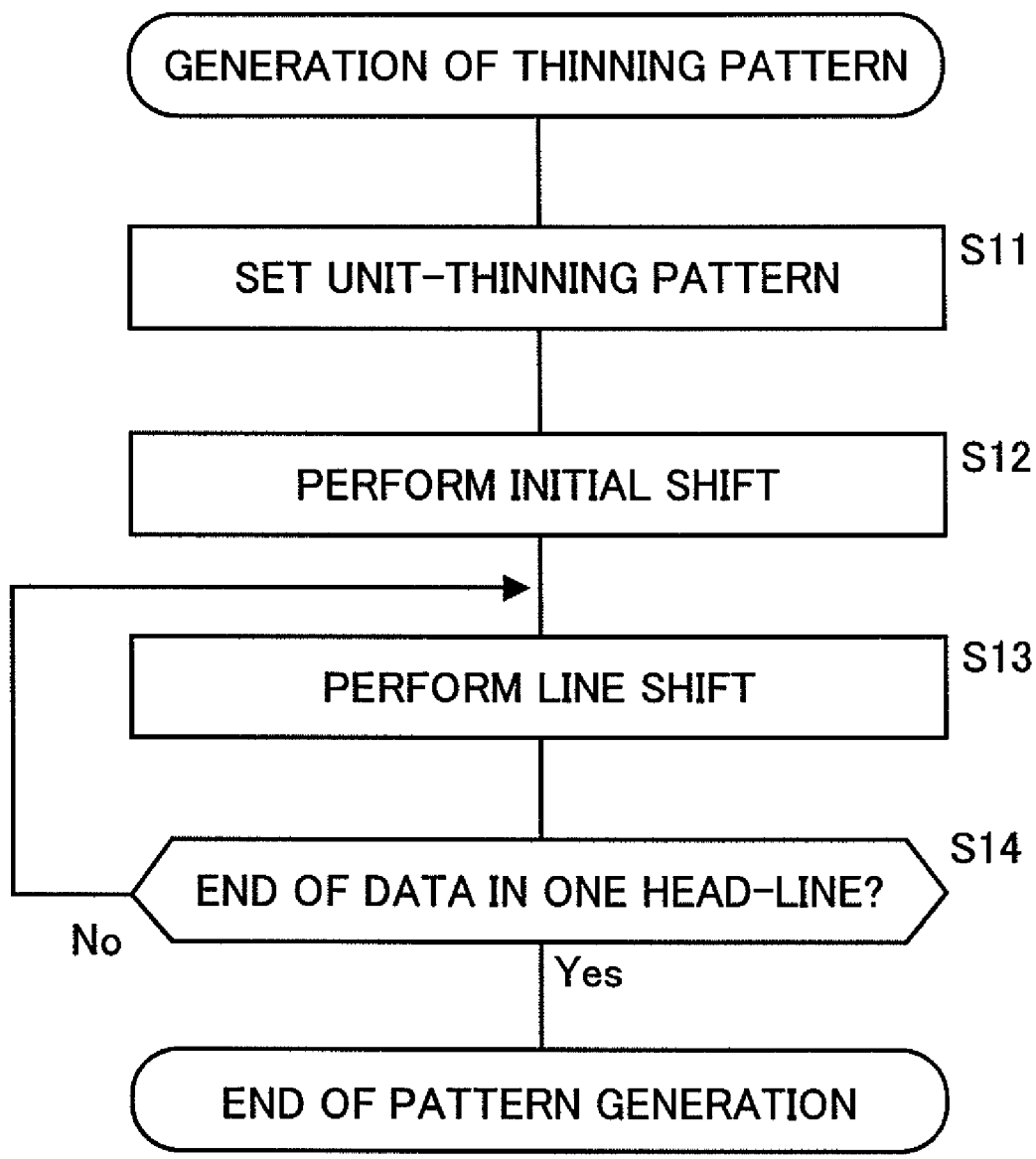
FIG. 21 is a flowchart showing the process of a duty control block in a form of the present invention in which multiple heads of the same color are arranged for recording.

FIG. 21 is a flowchart showing the process of the duty control circuit 20 in the form in which the multiple heads of the same color are arranged for recording. The operation of this form is similar to that shown in FIG. 15.

To generate a thinning pattern, a unit-thinning pattern is set (S11) and the initial shift processing is performed for this unit-thinning pattern (S12). The line shift processing is performed for the unit-thinning pattern for which the initial shift was performed (S13). The line shift processing is performed for each head to generate one line of data for the head (S14).

Figure 22:
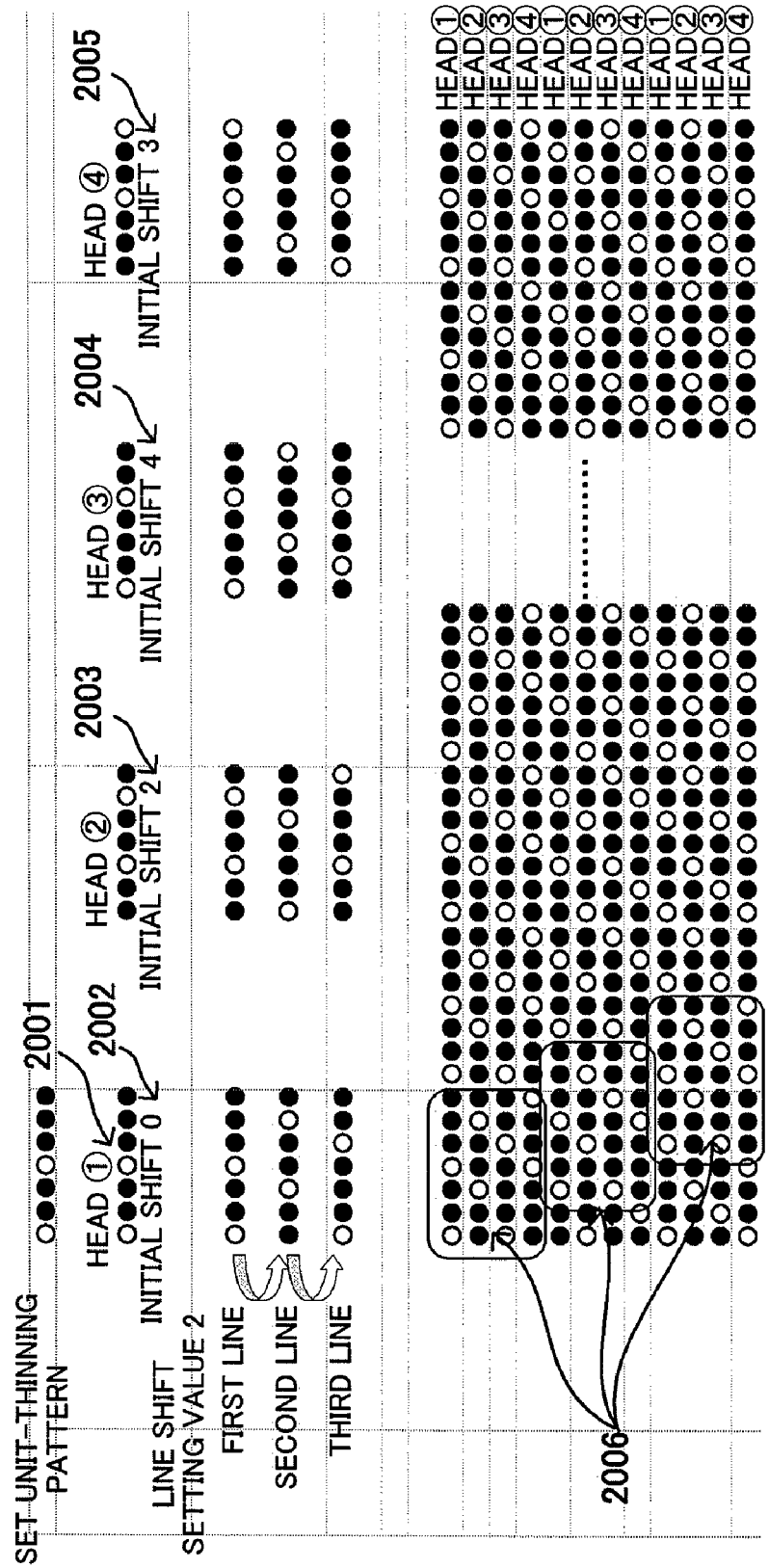
FIG. 22 is a diagram showing an example of thinning pattern generation when the line shift and the initial shift of the present invention are combined.

FIG. 22 is a diagram showing an example of thinning pattern generation when the line shift and the initial shift are combined. In this generation example, a thinning pattern is generated with a block as a unit, wherein one block is composed of a combination of the recording width direction dots and the feed direction dots. The blocks are arranged in the recording width direction to generate a thinning pattern for multiple lines to be recorded in one recording operation. In addition, when the next recording operation is performed, the blocks are shifted in the feed direction to generate a thinning pattern for the next multiple lines.

By combining the initially-set, multiple-bit thinning pattern with the initial shift value for generating the thinning patterns used by the adjacent heads, it is possible to prevent the same thinning pattern from being repeated in the feed direction, that is, in the adjacent heads, as shown in FIG. 22.

For example, the unit-thinning pattern "○●●○●●●" is set in the register in FIG. 22 (2001).

Next, the initial shift value of "0" is set for head "1", the initial shift value of "2" is set for head 2, the initial shift value of "4" is set for head 3, and the initial shift value of "3" is set for head 4. Those settings generate the following initial patterns: "○●●○●●●" for head 1 (2002), "●●○●●○●" for head 2 (2003), "○●●●○●●" for head 3 (2004), and "●●●○●●○" for head 4 (2005).

To record lines 1-4 in the first recording operation, heads 1-4 record data based on the initial pattern. To record lines 5-8 in the second recording operation that is performed next, the initial pattern of heads 1-4 is shifted by the line shift function. In this case, the initial pattern is shifted right two dots assuming that the setting value is "2".

When the heads of the same color are arranged for recording, the thinning pattern is shifted as a block, which is a rectangle of vertical 4 dots and horizontal 7 dots (7-bit thinning pattern), in the right direction by the number of bits specified as the line shift amount to generate a thinning pattern.

The consecutive ON pixels in recording data can be counted by the counting unit. If the count value is equal to or larger than the value specified as the threshold, the duty control operation unit in the circuit, such as an ASIC, combines the thinning pattern generated as described above with the recording data to perform the duty control processing for the input image data to generate thinned-out output image data.

In this form, when the heads of the same color are arranged for recording, a thinning pattern can be generated with a multiple-bit (7 bits in this example) thinning pattern, an initial shift value, and a line shift value stored in the registers in the duty control circuit.

This thinning pattern is used to thin out data at the same time recording data is transferred, one line at a time (which is one of the characteristics of a line head), the advantage is that there is no need to save all generated thinning patterns in the memory. In addition, because the thinning pattern generation and the thinning processing are performed in parallel, only the internal circuit, such as an ASIC, is required to be set to perform the thinning processing, and the duty control can be performed without affecting high-speed recording that is one of advantages of an inkjet recording apparatus having line heads.

Although a four-color inkjet recording apparatus with four recording heads and a monochrome inkjet recording apparatus with four recording heads of the same color are used as the examples in this form, the present invention is not limited to four heads but any number of heads, two or six, may also be used to generate an appropriate thinning pattern.

If the recording duty value, which is a rate between "○" (data that is thinned out) and "●" (data that is not thinned out), can be represented by a small number of bits when defining a thinning pattern of multiple bits, the duty control circuit 20 that requires less space in the internal registers, such as an ASIC, can be created.

In addition, though a thinning pattern is shifted right in the initial shift processing circuit or the line shift processing circuit in the description above, the thinning pattern may be shifted not only in the right direction but also in any of the right and left directions.

Although the duty control is performed in the internal circuit such as an ASIC in the above example, it is also possible to configure the apparatus in such a way that a part of the duty control circuit is replaced by the internal processing of the CPU or by an external circuit without affecting the purpose and the effect of the present invention.

Even when objects of high-duty are recorded at high speed, the processing for thinning out recording data with the use of the duty control in this embodiment allows the recording data thinning control to be appropriately performed, prevents extra ink from being ejected in a position where ink is not necessarily required, and records high quality images with no stain on the paper or no paper transfer.

What is claimed is:

1. An inkjet recording apparatus that records data on a recording medium based on recording data, comprising:
   a plurality of line heads each of which has a plurality of recording elements across a whole recording area on the recording medium and drives said plurality of recording elements in each line for recording the recording data;
   a thinning pattern generation unit that, for each line head, generates one line of thinning pattern for each line of the recording data for determining whether or not each bit of the recording data is to be recorded, such that the line of thinning pattern for the same line head varies from line to line;
   a processing unit for varying the one line of thinning pattern for the recording data from line head to line head; and
   a thinning processing unit that, for each line head, generates thinned-out recording data generated by thinning out the recording data by applying the thinning pattern to the recording data;
   wherein each line head is driven by the thinned-out recording data generated by said thinning processing unit.

2. The inkjet recording apparatus according to claim 1, wherein said thinning pattern generation unit arranges a plurality of predetermined unit-thinning patterns in the recording width direction to generate the one line of thinning pattern.

3. The inkjet recording apparatus according to claim 2, wherein the unit-thinning pattern comprises a plurality of consecutive bits and
   each of the bits specifies whether or not each bit of the recording data is to be recorded.

4. The inkjet recording apparatus according to claim 2, wherein said thinning pattern generation unit has a plurality of unit-thinning patterns according to a plurality of recording duty values and selects one thinning pattern from the plurality of thinning patterns with the recording duty value as a parameter.

5. The inkjet recording apparatus according to claim 1, wherein said processing unit comprises a shift processing unit that shifts the thinning pattern in a recording width direction; and
   wherein said shift processing unit comprises an initial shift processing unit that shifts the one line of thinning pattern, generated by said thinning pattern generation unit, by an initial shift amount that differs among the line heads to set a shift among the line heads; and
   said thinning pattern generation unit comprising a line shift processing unit that, for each same line head of said plurality of line heads, shifts either the one line of thinning pattern generated by said thinning pattern generation unit or the one line of thinning pattern shifted by said initial shift processing unit in the recording width direction each time a line is recorded to set a shift among the lines.

6. The inkjet recording apparatus according to claim 5, wherein said initial shift processing unit has an operation unit that shifts the one line of thinning pattern in the recording width direction a predetermined number of bits for each line head of said plurality of line heads.

7. The inkjet recording apparatus according to claim 5, wherein said initial shift processing unit shifts an arrangement position of the unit-thinning pattern in a line, predetermined for each line head by said thinning pattern generation unit, in the recording width direction a predetermined number of bits and, from the position, arranges a plurality of the unit-thinning patterns in the recording width direction.

8. A recording data processing method for use by an inkjet recording apparatus that records data on a recording medium based on recording data and using a plurality of line heads, comprising the steps of:

causing one line of thinning pattern in a recording width direction for each line head to vary from line head to line head;

causing the line of thinning pattern for the same line head to vary from line to line; and applying the thinning pattern for each line head to the recording data to perform thinning processing.

9. An inkjet recording apparatus that records data on a recording medium based on recording data, comprising:

a plurality of line heads each including a plurality of recording elements arranged in a recording width direction of the recording medium;

a thinning pattern generation unit that, for each line head, generates one line of thinning pattern for each line of the recording data for determining whether or not each bit of the recording data is to be recorded, such that the line of thinning pattern for the same line head varies from line to line; and a processing unit for varying the one line of thinning pattern for the recording data from line head to line head.

* * * * *